United States Patent
Li et al.

(10) Patent No.: US 7,639,275 B2
(45) Date of Patent: *Dec. 29, 2009

(54) SUMMARIZATION OF FOOTBALL VIDEO CONTENT

(75) Inventors: Baoxin Li, Vancouver, WA (US); M. Ibrahim Sezan, Camas, WA (US); Jeffrey B. Sampsell, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 357 days.

This patent is subject to a terminal disclaimer.

(21) Appl. No.: 11/028,812

(22) Filed: Jan. 3, 2005

(65) Prior Publication Data
US 2005/0134686 A1    Jun. 23, 2005

Related U.S. Application Data

(62) Division of application No. 09/933,862, filed on Aug. 20, 2001, now Pat. No. 7,499,077.

(51) Int. Cl.
H04N 7/18 (2006.01)
(52) U.S. Cl. ...................................................... 348/159
(58) Field of Classification Search .................. 348/159
See application file for complete search history.

(56) References Cited

U.S. PATENT DOCUMENTS

| | | | |
|---|---|---|---|
| 3,580,573 A | 5/1971 | Noonan et al. | |
| 4,183,056 A | 1/1980 | Evans et al. | |
| 4,253,108 A | 2/1981 | Engel | |
| 4,298,884 A | 11/1981 | Reneau | |
| 4,321,635 A | 3/1982 | Tsuyuguchi | |
| 4,520,404 A | 5/1985 | Von Kohorn | |
| 4,651,199 A | 3/1987 | Alkofer | |
| 4,729,044 A | 3/1988 | Kiesel | |
| 4,937,685 A | 6/1990 | Barker et al. | |
| 5,027,400 A | 6/1991 | Baji et al. | |
| 5,101,364 A | 3/1992 | Davenport et al. | |
| 5,109,482 A | 4/1992 | Bohrman | |
| 5,148,154 A | 9/1992 | MacKay et al. | |
| 5,200,825 A | 4/1993 | Perine | |
| 5,249,967 A | 10/1993 | O'Leary et al. | |
| D348,251 S | 6/1994 | Hendricks | |
| 5,333,091 A | 7/1994 | Iggulden et al. | |
| 5,339,393 A | 8/1994 | Duffy et al. | |
| D354,059 S | 1/1995 | Hendricks | |
| 5,424,770 A | 6/1995 | Schmelzer et al. | |

(Continued)

FOREIGN PATENT DOCUMENTS

JP         11-032267         2/1999

(Continued)

OTHER PUBLICATIONS

Drew D. Saur, Yap-Peng Tan, Sanjeev R. Kulkarni, and Peter J. Ramadge, "Automated Analysis and Annotation of Basketball Video," SPIE vol. 3022, pp. 176-187.

(Continued)

*Primary Examiner*—Nhon T Diep
(74) *Attorney, Agent, or Firm*—Chernoff, Vilhauer, McClung & Stenzel

(57) ABSTRACT

Summarization of video content including football.

11 Claims, 15 Drawing Sheets

U.S. PATENT DOCUMENTS

| | | |
|---|---|---|
| 5,434,678 A | 7/1995 | Abecassis |
| 5,446,086 A | 8/1995 | Sugiyama et al. |
| 5,452,016 A | 9/1995 | Ohara et al. |
| D368,263 S | 3/1996 | Hendricks |
| 5,521,841 A | 5/1996 | Arman et al. |
| 5,559,549 A | 9/1996 | Hendricks et al. |
| 5,589,945 A | 12/1996 | Abecassis |
| 5,600,364 A | 2/1997 | Hendricks et al. |
| 5,600,573 A | 2/1997 | Hendricks et al. |
| 5,610,653 A | 3/1997 | Abecassis |
| 5,634,849 A | 6/1997 | Abecassis |
| 5,635,982 A | 6/1997 | Zhang et al. |
| D381,991 S | 8/1997 | Hendricks |
| 5,654,769 A | 8/1997 | Ohara et al. |
| 5,659,350 A | 8/1997 | Hendricks et al. |
| 5,664,046 A | 9/1997 | Abecassis |
| 5,664,227 A | 9/1997 | Mauldin et al. |
| 5,675,752 A | 10/1997 | Scott et al. |
| 5,682,195 A | 10/1997 | Hendricks et al. |
| 5,684,918 A | 11/1997 | Abecassis |
| 5,696,869 A | 12/1997 | Abecassis |
| 5,710,884 A | 1/1998 | Dedrick |
| 5,717,814 A | 2/1998 | Abecassis |
| 5,724,472 A | 3/1998 | Abecassis |
| 5,734,853 A | 3/1998 | Hendricks et al. |
| 5,761,881 A | 6/1998 | Wall |
| 5,774,357 A | 6/1998 | Hoffberg et al. |
| 5,778,108 A | 7/1998 | Coleman, Jr. |
| 5,797,001 A | 8/1998 | Augenbraun et al. |
| 5,798,785 A | 8/1998 | Hendricks |
| 5,805,733 A | 9/1998 | Wang et al. |
| 5,821,945 A | 10/1998 | Yeo et al. |
| 5,828,809 A | 10/1998 | Chang et al. |
| D402,310 S | 12/1998 | Hendricks |
| 5,861,881 A | 1/1999 | Freeman et al. |
| 5,867,386 A | 2/1999 | Hoffberg et al. |
| 5,875,108 A | 2/1999 | Hoffberg et al. |
| 5,892,536 A | 4/1999 | Logan et al. |
| 5,900,867 A | 5/1999 | Schindler et al. |
| 5,901,246 A | 5/1999 | Hoffberg et al. |
| 5,903,454 A | 5/1999 | Hoffberg et al. |
| 5,913,013 A | 6/1999 | Abecassis |
| 5,920,360 A | 7/1999 | Coleman, Jr. |
| 5,920,477 A | 7/1999 | Hoffberg et al. |
| 5,923,365 A | 7/1999 | Tamir et al. |
| 5,926,624 A | 7/1999 | Katz et al. |
| 5,933,811 A | 8/1999 | Angles et al. |
| 5,956,026 A | 9/1999 | Ratakonda |
| 5,958,006 A | 9/1999 | Eggleston et al. |
| 5,959,681 A | 9/1999 | Cho |
| 5,959,697 A | 9/1999 | Coleman, Jr. |
| 5,969,755 A | 10/1999 | Courtney |
| 5,973,683 A | 10/1999 | Cragun et al. |
| 5,986,690 A | 11/1999 | Hendricks |
| 5,986,692 A | 11/1999 | Logan et al. |
| 5,987,211 A | 11/1999 | Abecassis |
| 5,990,927 A | 11/1999 | Hendricks et al. |
| 5,990,980 A | 11/1999 | Golin |
| 5,995,095 A | 11/1999 | Ratakonda |
| 6,002,833 A | 12/1999 | Abecassis |
| 6,011,895 A | 1/2000 | Abecassis |
| 6,014,183 A | 1/2000 | Hoang |
| 6,038,367 A | 3/2000 | Abecassis |
| 6,052,554 A | 4/2000 | Hendricks et al. |
| 6,055,018 A | 4/2000 | Swan |
| 6,067,401 A | 5/2000 | Abecassis |
| 6,072,934 A | 6/2000 | Abecassis |
| 6,081,750 A | 6/2000 | Hoffberg et al. |
| 6,088,455 A | 7/2000 | Logan et al. |
| 6,091,886 A | 7/2000 | Abecassis |
| RE36,801 E | 8/2000 | Logan et al. |
| 6,100,941 A | 8/2000 | Dimitrova et al. |
| 6,141,041 A | 10/2000 | Carlbom et al. |
| 6,141,060 A | 10/2000 | Honey et al. |
| 6,144,375 A | 11/2000 | Jain et al. |
| 6,151,444 A | 11/2000 | Abecassis |
| D435,561 S | 12/2000 | Pettigrew et al. |
| 6,160,989 A | 12/2000 | Hendricks et al. |
| 6,161,142 A | 12/2000 | Wolfe et al. |
| 6,169,542 B1 | 1/2001 | Hooks et al. |
| 6,181,335 B1 | 1/2001 | Hendricks et al. |
| 6,195,497 B1 | 2/2001 | Nagasaka et al. |
| 6,201,536 B1 | 3/2001 | Hendricks et al. |
| 6,208,805 B1 | 3/2001 | Abecassis |
| 6,215,526 B1 | 4/2001 | Barton et al. |
| 6,216,129 B1 | 4/2001 | Eldering |
| 6,219,837 B1 | 4/2001 | Yeo et al. |
| 6,230,501 B1 | 5/2001 | Bailey, Sr. et al. |
| 6,233,389 B1 | 5/2001 | Barton et al. |
| 6,236,395 B1 | 5/2001 | Sezan et al. |
| 6,252,544 B1 | 6/2001 | Hoffberg |
| 6,269,216 B1 | 7/2001 | Abecassis |
| 6,275,268 B1 | 8/2001 | Ellis et al. |
| 6,289,165 B1 | 9/2001 | Abecassis |
| 6,304,665 B1 | 10/2001 | Cavallaro et al. |
| 6,304,715 B1 | 10/2001 | Abecassis |
| 6,342,904 B1 | 1/2002 | Vasudevan et al. |
| 6,363,160 B1 | 3/2002 | Bradski et al. |
| 6,418,168 B1 | 7/2002 | Narita |
| 6,546,188 B1 | 4/2003 | Ishii et al. |
| 6,549,643 B1 | 4/2003 | Toklu et al. |
| 6,556,767 B2 | 4/2003 | Okayama et al. |
| 6,557,482 B1 | 5/2003 | Doty |
| 6,597,859 B1 | 7/2003 | Leinhart et al. |
| 6,665,423 B1 | 12/2003 | Mehrotra et al. |
| 6,678,635 B2 | 1/2004 | Tovinkere et al. |
| 6,691,126 B1 | 2/2004 | Syeda-Mahmood |
| 6,724,933 B1 | 4/2004 | Lin et al. |
| 6,774,917 B1 | 8/2004 | Foote et al. |
| 6,829,781 B1 | 12/2004 | Bhagavath et al. |
| 6,870,956 B2 | 3/2005 | Qi et al. |
| 6,931,595 B2 | 8/2005 | Pan et al. |
| 6,970,510 B1 | 11/2005 | Wee et al. |
| 6,981,129 B1 | 12/2005 | Boggs et al. |
| 6,993,245 B1 | 1/2006 | Harville |
| 7,020,351 B1 | 3/2006 | Kumar et al. |
| 2002/0013943 A1 | 1/2002 | Haberman et al. |
| 2002/0018594 A1 | 2/2002 | Xu et al. |
| 2002/0080162 A1 | 6/2002 | Pan et al. |
| 2002/0083473 A1 | 6/2002 | Agnihotri et al. |
| 2002/0120929 A1 | 8/2002 | Schwalb et al. |
| 2002/0141619 A1 | 10/2002 | Standridge et al. |
| 2002/0184220 A1 | 12/2002 | Teraguchi et al. |
| 2002/0194589 A1 | 12/2002 | Cristofalo et al. |
| 2003/0001880 A1 | 1/2003 | Holtz et al. |
| 2003/0026592 A1 | 2/2003 | Kawhara et al. |
| 2003/0081937 A1 | 5/2003 | Li |
| 2004/0017389 A1 | 1/2004 | Pan et al. |
| 2004/0088289 A1 | 5/2004 | Xu et al. |
| 2004/0125124 A1 | 7/2004 | Kim et al. |
| 2004/0125877 A1 | 7/2004 | Chang et al. |
| 2004/0227768 A1 | 11/2004 | Bates et al. |
| 2005/0028194 A1* | 2/2005 | Elenbaas et al. .............. 725/32 |

FOREIGN PATENT DOCUMENTS

| | | |
|---|---|---|
| JP | 11-261908 | 9/1999 |
| JP | 2000-013755 | 1/2000 |
| WO | WO 99/65237 | 12/1999 |

OTHER PUBLICATIONS

Selim Aksoy and Robert M. Haralick, "Textural Features for Image Database Retrieval," Intelligent Systems Laboratory, Department of Electrical Engineering, University of Washington, Seattle.

Giridharan Iyengar and Andrew Lippman, "Models for automatic classification of video sequences," SPIE vol. 3312, pp. 216-227.

Hongjiang Zhang, Stephen W. Smoliar and Jian Hua Wu, "Content-Based Video Browsing Tools," SPIE vol. 2417, pp. 389-398.

Bilge Gunsel, Yue Fu and A. Murat Tekalp, "Hierarchical Temporal Video Segmentation and Content Characterization," SPIE vol. 3229, pp. 46-56.

Sunghoon Choi, Yongduek Seo, Hyunwoo Kim, and Ki-Sang Hong, "Where are the ball and players?; Soccer Game Analysis with Color-based Tracking and Image Mosaick," Dept. of EE, Pohang University of Science and Technology, Republic of Korea, pp. 1-15.

Vikrant Kobla, Daniel DeMenthon, and David Doermann, "Identifying Sports Videos Using Replay, Text, and Camera Motion Features," University of Maryland, Laboratory for Language and Media Processing; at least one year prior to filing date; 12 pages.

Richard W. Conners and Charles A. Harlow, "A Theoretical Comparison of Texture Algorithms," IEEE Transactions on Pattern Analysis and Machine Intelligence, vol. PAMI-2, No. 3, May 1980, pp. 204-222.

S. E. Levinson, L. R. Rabiner, and M. M. Sondhi "An Introduction to the Application of the Theory of Probabilistic Functions of a Markov Process to Automatic Speech Recognition," American Telephone and Telegraph Company, The Bell System Technical Journal, vol. 62, No. 4, Apr. 1983, pp. 1035-1074.

John Canny, "A Computational approach to Edge Detection," IEEE Transactions on Pattern Analysis and Machine Intelligence, vol. PAMI-8, No. 6, Nov. 1986, pp. 679-698.

Lawrence R. Rabiner, "A Tutorial on Hidden Markov Models and Selected Applications in Speech Recognition," Proceedings of the IEEE, vol. 77, No. 2, Feb. 1989, pp. 257-286.

B. B. Chaudhuri, N. Sarkar, and P. Kundu, "Improved Fractal Geometry Based Texture Segmentation Technique," IEEE Proceedings-E, vol. 140, No. 5, Sep. 1993, pp. 233-241.

Alberto Del Bimbo, Enrico Vicario and Daniele Zingoni, "A Spatial Logic for Symbolic Description of Image Contents," Journal of Visual Languages and Computing (1994) 5, pp. 267-286.

Zhang Stephen W. Smoliar and Hongjiang, "Content-Based Video Indexing and Retrieval," IEEE 1994, pp. 62-72.

F. Arman, R. Depommier, A. Hsu, and M-Y. Chiu, "Content-based Browsing of Video Sequences," Proceedings of ACM International Conference on Multimedia '94, Oct. 15-20, San Francisco, CA, USA.

Stephen S. Intille and Aaron F. Bobick, "Visual Tracking Using Closed-Worlds," M.I.T. Media Laboratory Perceptual computing Section Technical Report No. 294, Nov. 1994, pp. 1-18.

Stephen S. Intille, "Tracking Using a Local Closed-World Assumption: Tracking in the Football Domain," M.I.T. Media Lab Perceptual Computing Group Technical Report No. 296, pp. 1-62, Submitted to the Program in Media Arts and Sciences, School of Architecture and Planning on Aug. 5, 1994.

Boon-Lock Yeo and Bede Liu, "On The Extraction Of DC Sequence From MPEG Compressed Video," IEEE 1995, pp. 260-263.

Yihong Gong, Lim Teck Sin, Chua Hock Chuan, Hongjiang Zhang, Masao Sakauchi, "Automatic Parsing of TV Soccer Programs," IEEE 1995, pp. 167-174.

Dennis Yow, Boon-Lock Yeo, Minerva Yeung and Bede Liu, "Analysis and Presentation of Soccer Highlights From Digital Video," Proceedings, Second Asian Conference on Computer Vision (ACCV '95).

Michael A. Smith and Takeo Kanade, "Video Skimming for Quick Browsing based on Audio and Image Characterization," Jul. 30, 1995, Carnegie Mellon University, School of Computer Science, Pittsburgh, PA.

Nevenka Dimitrova and Forousan Golshani, "Motion Recovery for video Content Classification," ACM Transactions on Information Systems, vol. 13, No. 4, Oct. 1995, pp. 408-139.

R. W. Picard, "A Society of Models for Video and Image Libraries," IBM Systems Journal, vol. 35, Nos. 3&4, 1996, pp. 292-312.

B.S. Manjunath and W.Y. Ma, "Texture Features for Browsing and Retrieval of Image Data," IEEE Transactions on Pattern Analysis and Machine Intelligence, vol. 18, No. 8, Aug. 1996, pp. 837-842.

Shin'ichi Satoh and Takeo Kanade, "Name-It: Association of Face and Name in Video,", School of Computer Science Carnegie Mellon University, Pittsburgh, PA, Dec. 20, 1996, pp. 1-17.

Minerva Yeung, Boon-Lock Yeo, and Bede Liu, "Extracting Story Units from Long Programs for Video Browsing and Navigation," IEEE 1996, pp. 296-305.

Wayne Wolf, "Hidden Markov Model Parsing of Video Programs," Proceedings of the 1997 IEEE International Conference on Acoustics, Speech, and Signal Processing, 1997, pp. 2609-2611.

Jonathan D. Courtney, "Automatic Video Indexing via Object Motion Analysis," Pattern Recognition, vol. 30, No. 4, pp. 607-625, 1997.

Minerva M. Yeung, "Video Visualization for Compact Presentation and Fast Browsing of Pictorial Content," IEEE Transactions on Circuits and Systems for Video Technology, vol. 7, No. 5, Oct. 1997, pp. 771-785.

Rainer Lienhart, Silvia Pfeiffer, and Wolfgang Effelsberg, "Video Abstracting," Communications of the ACM, vol. 40, No. 12, Dec. 1997, pp. 55-62.

Boon-Lock Yeo and Minerva M. Yeung, "Retrieving and Visualizing Video," Communications of the ACM, Dec. 1997, vol. 40 No. 12, pp. 43-52.

Mark T. Maybury and Andrew E. Merlino, "Multimedia Summaries of Broadcast News," IEEE 1997, pp. 442-449.

Michael T. Chan, You Zang and Thomas S. Huang, "Real-Time Lip Tracking and Bimodal Continuous Speech Recognition," 1998.

T. Lambrou, P. Kudumakis, R. Speller, M. Sandler, and A. Linney, "Classification of Audio Signals Using Statistical Features on Time and Wavelet Transform Domains," IEEE 1998, pp. 3621-3624.

Padhraic Smyth, "Belief Networks, Hidden Markov Models, and Markov Random Fields: a Unifying View," Information and Computer Science Department, University of California, Irvine, CA, Mar. 20, 1998, pp. 1-11.

Richard J. Qian, M. Ibrahim Sezan, and Kristine E. Matthews, "A Robust Real-Time Face Tracking Algorithm," IEEE 1998, pp. 131-135.

Dulce Ponceleon, Savitha Srinivasan, Arnon Amir, Dragutin Petkovic, and Dan Diklic, "Key to Effective Video Retrieval: Effective Cataloging and Browsing," ACM, Aug. 1998, pp. 99-107.

Daniel DeMenthon, Vikrant Kobla and David Doermann, "Video Summarization by Curve Simplification," ACM 1998, pp. 211-218.

Nuno Vasconcelos and Andrew Lippman, "Bayesian Modeling of Video Editing and Structure: Semantic Features for Video Summarization and Browsing," IEEE 1998, pp. 153-157.

Toshio Kawashima, Kouichi Tateyama, Toshimasa Iijima, and Yoshinao Aoki, "Indexing of Baseball Telecast for Content-based Video Retrieval," IEEE 1998, pp. 871-874.

M. R. Naphade, R.Mehrotra, A. M. Ferman, J. Warnick, T, S. Huang, A. M. Tekalp, "A High-Performance Shot Boundary Detection Algorithm Using Multiple Cues," Proceedings of IEEE International Conference on Image Processing, Chicago, IL, 1998, pp. 884-887.

John S. Boreczky and Lynn D. Wilcox "A Hidden Markov Model Framework for Video Segmentation Using Audio and Image Features," Proceedings of IEEE International Conference on Acoustics, Speech, and Signal Processing, Seattle, WA, 1998.

Richard Qian, Niels Haering, and Ibrahim Sezan, "A Computational Approach to Semantic Event Detection," IEEE 1999, pp. 200-206.

Zhu Liu and Quian Huang, "Detecting News Reporting Using Audio/Visual Information," IEEE 1999, pp. 324-328.

Vikrant Kobla, Daniel DeMenthon, and David Doermann, "Detection of Slow-Motion Replay Sequences for Identifying Sports Videos," IEEE Conference, 1999, pp. 135-140.

Rainer Lienhart, "Comparison of Automatic Shot Boundary Detection Algorithms," Part of the IS&T/SPIE Conference on Storage and Retrieval for Image and Video Databases VII, San Jose, California, Jan. 1999, SPIE vol. 3656.

H.B. Lu, Y.J. Zhang, Y.R. Yao, "Robust Gradual Scene Change Detection," Proceedings of IEEE International Conference on Image Processing, Kobe, Japan, 1999.

Stuart J. Golin, "New Metric to Detect Wipes and Other Gradual Transitions in . . . ," Part of the IS&T/SPIE Conference on Visual Communications and Image Processing '99, San Jose, California, Jan. 1999, SPIE vol. 3653, pp. 1464-1474.

Stefan Eickeler and Stefan Muller, "Content-Based Video Indexing of TV Broadcast News Using Hidden Markov Models," Proceedings of IEEE International Conference on Acoustics, speech, and Signal Processing, Phoenix, AZ 1999.

Noboru Babaguchi, "Towards Abstracting sports Video by Highlights," IEEE 2000, pp. 1519-1522.

Ullas Gargi, Rangachar Kasturi, and Susan H. Strayer, "Performance Characterization of Video-Shot-Change Detection Methods," IEEE Transactions on Circuits and Systems for Video Technology, vol. 10, No. 1, Feb. 2000, pp. 1-13.

Yao Wang, Zhu Liu, and Jin-Cheng Huang, "Multimedia Content Analysis," IEEE Signal Processing Magazine, Nov. 2000, pp. 12-35.

Yong Rui, Anoop Gupta, and Alex Acero, "Automatically Extracting Highlights for TV Baseball Programs," ACM Multimedia2000, Los Angeles, CA, USA, pp. 105-115.

Noboru Babaguchi, Yoshihiko Kawai, Yukinobu Yasugi, and Tadahiro Kitahashi, "Linking Live and Replay Scenes in Broadcasted Sports Video," Proceedings of ACM Multimedia 2000 Workshop on Multimedia Information Retrieval (MIR2000), pp. 205-208, Nov. 2000.

Chung-Lin Huang and Chih-Yu Chang, "Video Summarization using Hidden Markov Model," IEEE 2001, pp. 473-478.

H. Pan, P. van Beek, and M. I. Sezan, "Detection of Slow-Motion Replay Segments in Sports Video for Highlights Generation," Proceedings of IEEE International Conference on Acoustics, Speech, and Signal Processing, Salt Lake city, UT, 2001.

Frank R. Kschischang, Brendan J. Frey, and Hans-Andrea Loeliger, "Factor Graphs and the Sum-Product Algorithm" IEEE Transactions on Information Theory, vol. 47, No. 2, Feb. 2001, pp. 498-518.

Peng Xu, Chih-Fu Chang, Ajay Divakaran, Anthony Vetro, and Huifang Sun, "Algorithms and System for High-Level Structure Analysis and Event Detection in Soccer Video," Columbia University, Advent—Technical Report #111, Jun. 2001.

Baoxin Li and M. Ibrahim Sezan, "Event Detection and Summarization in sports Video," to be presented in IEEE Workshop on Content-Based Access of Image and Video Libraries (Joint with CUPR), Kauai, Hawaii, Dec. 2001.

Kawai, et al., "Detection of Replay in Broadcast Sports Video by Focusing on Digital Video Effects," IEICE (DII), vol. J84-DII, No. 2, pp. 432-435, Feb. 2001, (in Japanese).

Hao Pan, Baoxin Li, and M. Ibrahim Sezan, "Automatic Detection of Replay Segments in Broadcast Sports Programs by Detection of Logos in Scene Transitions," IEEE ICASSP 2002, pp. 3385-3388.

Lexing Xie and Shih-Fu Chang, "Structure Analysis of Soccer Video with Hidden Markov Models," ICASSP, 2002.

Riccardo Leonardi and Perangelo Migliorati, "Semantic Indexing of Multimedia Documents," IEEE 2002 (Apr.-Jun. 2002), pp. 44-51.

Richard O. Duda and Peter E. Hart, "Use of the Hough Transformation To Detect Lines and Curves in Pictures," Stanford Research Institute, Menlo Park, California, Copyright 1972, pp. 11-15.

Alan E. Bell, "The dynamic digital disk," IEEE Spectrum, Oct. 1999, pp. 28-35.

International Organization for Standardization, ISO/IEC JTC1/SC29/WG11/N3399, Coding of Moving Pictures and Associated Audio, "Visual Working Draft 3.0," Jun. 2000, Geneva.

International Organization for Standardization, ISO/IEC JTC1/SC29/WG11/N3398, Coding of Moving Pictures and Associated Audio Information, "MPEG-7 Visual Part of eXperimentation Model Version 6.0," Jun. 2000, Geneva.

International Organization for Standardization, ISO/IEC JTC 1/SC 29/WG 11/N3410, Coding of Moving Pictures and Audio, MPEG-7 Multimedia Description Schemes XM (Version 3.0), May 2000, Geneva.

International Organization for Standardization ISO/IEC JTC 1/SC 29/WG 11/N3411, Coding of Moving Pictures and Audio, MPEG-7 Multimedia Description Schemes WD (Version 3.0), May 2000, Geneva.

International Organization for Standardization, ISO/IEC JTC1/SC29/WG11/N3391, Coding of Moving Pictures and Associated Audio, "DDL Working Draft 3.0," May 2000, Geneva.

International Organization for Standardization, ISO/IEC JTC1/SC29/WG11/N2844, Coding of Moving Pictures and Audio Information, "MPEG-7 Description Schemes (V0.5)," Jul. 1999, Vancouver.

International Organization for Standardization, ISO/IEC JTC1/SC29/WG11/MXXXX, MPEG-7 Media/Meta DSs upgrade (V02.), Oct. 1999, Melbourne.

ISO/IEC JTC 1/SC 29 N3705, "Information Technology-Multimedia Content Description Interface—Part 5: Multimedia Description Schemes," Nov. 17, 2000.

International Organization for Standardization, ISO/IEC JTC 1/SC 29/WG 11/N3966, Information technology-Multimedia Content Description Interface- part 5: Multimedia Description Schemes, Mar. 12, 2001.

"XML Schema Part 1: Structures," W3C Working Draft, May 6, 1999, pp. 1-60.

"XML Schema Part 2: Datatypes," World Wide Web Consortium Working Draft, May 6, 1999, pp. 1-37.

"A Schema for TV-anytime: Segmentation Metadata AN195," NDS Contribution from MyTV, Copyright NDS Limited 2000, pp. 1-27.

"A Schema for TV-Anytime Segmentation Metadata AN195r1," myTV project, Copyright NDS Limited 2000, pp. 1-28.

* cited by examiner

Commercials

SUMMARIZATION OF FOOTBALL VIDEO CONTENT

CROSS-REFERENCE TO RELATED APPLICATIONS

The present application is a divisional application of and claims priority to U.S. patent application Ser. No. 09/933,862, filed Aug. 20, 2001 now U.S. Pat. No. 7,499,077.

BACKGROUND OF THE INVENTION

The present invention relates to summarization of video content including football.

The amount of video content is expanding at an ever increasing rate, some of which includes sporting events. Simultaneously, the available time for viewers to consume or otherwise view all of the desirable video content is decreasing. With the increased amount of video content coupled with the decreasing time available to view the video content, it becomes increasingly problematic for viewers to view all of the potentially desirable content in its entirety. Accordingly, viewers are increasingly selective regarding the video content that they select to view. To accommodate viewer demands, techniques have been developed to provide a summarization of the video representative in some manner of the entire video. Video summarization likewise facilitates additional features including browsing, filtering, indexing, retrieval, etc. The typical purpose for creating a video summarization is to obtain a compact representation of the original video for subsequent viewing.

There are two major approaches to video summarization. The first approach for video summarization is key frame detection. Key frame detection includes mechanisms that process low level characteristics of the video, such as its color distribution, to determine those particular isolated frames that are most representative of particular portions of the video. For example, a key frame summarization of a video may contain only a few isolated key frames which potentially highlight the most important events in the video. Thus some limited information about the video can be inferred from the selection of key frames. Key frame techniques are especially suitable for indexing video content but are not especially suitable for summarizing sporting content.

The second approach for video summarization is directed at detecting events that are important for the particular video content. Such techniques normally include a definition and model of anticipated events of particular importance for a particular type of content. The video summarization may consist of many video segments, each of which is a continuous portion in the original video, allowing some detailed information from the video to be viewed by the user in a time effective manner. Such techniques are especially suitable for the efficient consumption of the content of a video by browsing only its summary. Such approaches facilitate what is sometimes referred to as "semantic summaries."

What is desired, therefore, is a video summarization technique suitable for video content that includes football.

DETAILED DESCRIPTION OF THE PREFERRED EMBODIMENT

Figure 1:
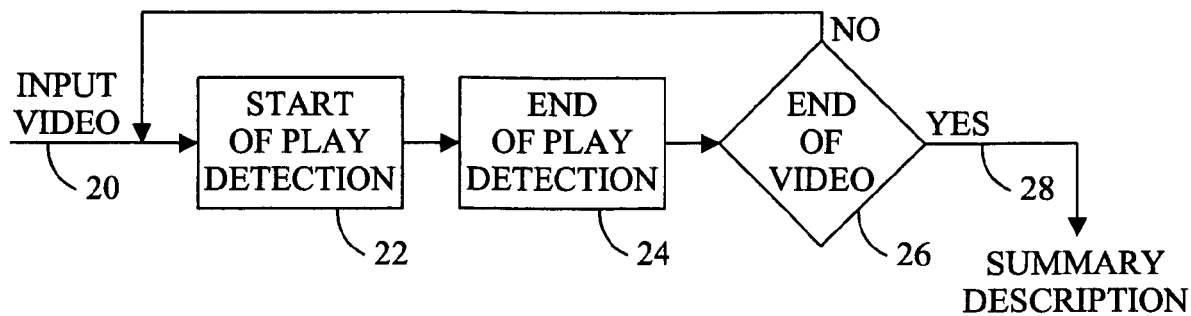
FIG. 1 is an exemplary flowchart for play detection.

A typical football game lasts about 3 hours of which only about one hour turns out to include time during which the ball is in action. The time during which the ball is in action is normally the exciting part of the game, such as for example, a kickoff, a hike, a pass play, a running play, a punt return, a punt, a field goal, etc. The remaining time during the football game is typically not exciting to watch on video, such as for example, nearly endless commercials, the time during which the players change from offense to defense, the time during which the players walk onto the field, the time during which the players are in the huddle, the time during which the coach talks to the quarterback, the time during which the yardsticks are moved, the time during which the ball is moved to the spot, the time during which the spectators are viewed in the bleachers, the time during which the commentators talk, etc. While it may indeed be entertaining to sit in a stadium for three hours for a one hour football game, many people who watch a video of a football game find it difficult to watch all of the game, even if they are loyal fans. A video summarization of the football video, which provides a summary of the game having a duration shorter than the original football video, may be appealing to many people. The video summarization should provide nearly the same level of the excitement (e.g. interest) that the original game provided.

Upon initial consideration, football would not be a suitable candidate to attempt automated video summarization. Initially, there are nearly an endless number of potential plays that may occur which would need to be accounted for in some manner. Also, there are many different types of plays, such as a kickoff, a punt, a pass play, a kickoff return, a running play, a reverse play, an interception, a sack, etc., that likewise would need to be accounted for in some manner. In addition, each of these plays involves significant player motion which is difficult to anticipate, difficult to track, and is not consistent between plays. Moreover, the ball would normally be difficult, if not impossible, to track during a play because much of the time it is obscured from view. For example, it would be difficult to distinguish interesting play related activity from typical pre-play activity of the players walking around the field getting ready for the next play. Based upon such considerations has been previously considered impractical, if not impossible, to attempt to summarize football.

It is conceivably possible to develop highly sophisticated models of a typical football video to identify potentially relevant portions of the video. However, such highly sophisticated models are difficult to create and are not normally robust. Further, the likelihood that a majority of the highly relevant portions of the football video will be included in such a video summarization is low because of the selectivity of the model. Thus the resulting video summarization of the football game may simply be unsatisfactory to the average viewer.

After consideration of the difficulty of developing highly sophisticated models of a football video to analyze the content of the football video, as the sole basis upon which to create a football summarization, the present inventors determined that this technique is ultimately flawed as the models will likely never be sufficiently robust to detect all the desirable content. Moreover, the number of different types of model sequences of potentially desirable content is difficult to quantify. In contrast to attempting to detect particular model sequences, the present inventors determined that the desirable segments of the football game are preferably selected based upon a "play." A "play" may be defined as an sequence of events defined by the rules of football. In particular, the sequence of events of a "play" may be defined as the time generally at which the ball is put into play (e.g., a time based upon when the ball is put into play) and the time generally at which when the ball is considered out of play (e.g., a time based upon when the ball is considered out of play). Normally the "play" would include a related series of activities that could potentially result in a score (or a related series of activities that could prevent a score) and/or otherwise advancing the team toward scoring (or prevent advancing the team toward scoring).

An example of an activity that could potentially result in a score, may include for example, throwing the ball far down field, kicking a field goal, kicking a point after, and running the ball. An example of an activity that could potentially result in preventing a score, may include for example, intercepting the ball, recovering a fumble, causing a fumble, dropping the ball, and blocking a field goal, punt, or point after attempt. An example of an activity that could potentially advance a team toward scoring, may be for example, tackling the runner running, catching the ball, and an on-side kick. An example of an activity that could potentially prevent advancement a team toward scoring, may be for example, tackling the runner, tackling the receiver, and a violation. It is to be understood that the temporal bounds of a particular type of "play" does not necessarily start or end at a particular instance, but rather at a time generally coincident with the start and end of the play or otherwise based upon, at least in part, a time (e.g., event) based upon a play. For example, a "play" starting with the hiking the ball may include the time at which the center hikes the ball, the time at which the quarterback receives the ball, the time at which the ball is in the air, the time at which the ball is spotted, the time the kicker kicks the ball, and/or the time at which the center touches the ball prior to hiking the ball. A summarization of the video is created by including a plurality of video segments, where the summarization includes fewer frames than the original video from which the summarization was created. A summarization that includes a plurality of the plays of the football game provides the viewer with a shorted video sequence while permitting the viewer to still enjoy the game because most of the exciting portions of the video are provided, preferably in the same temporally sequential manner as in the original football video.

Figure 27:
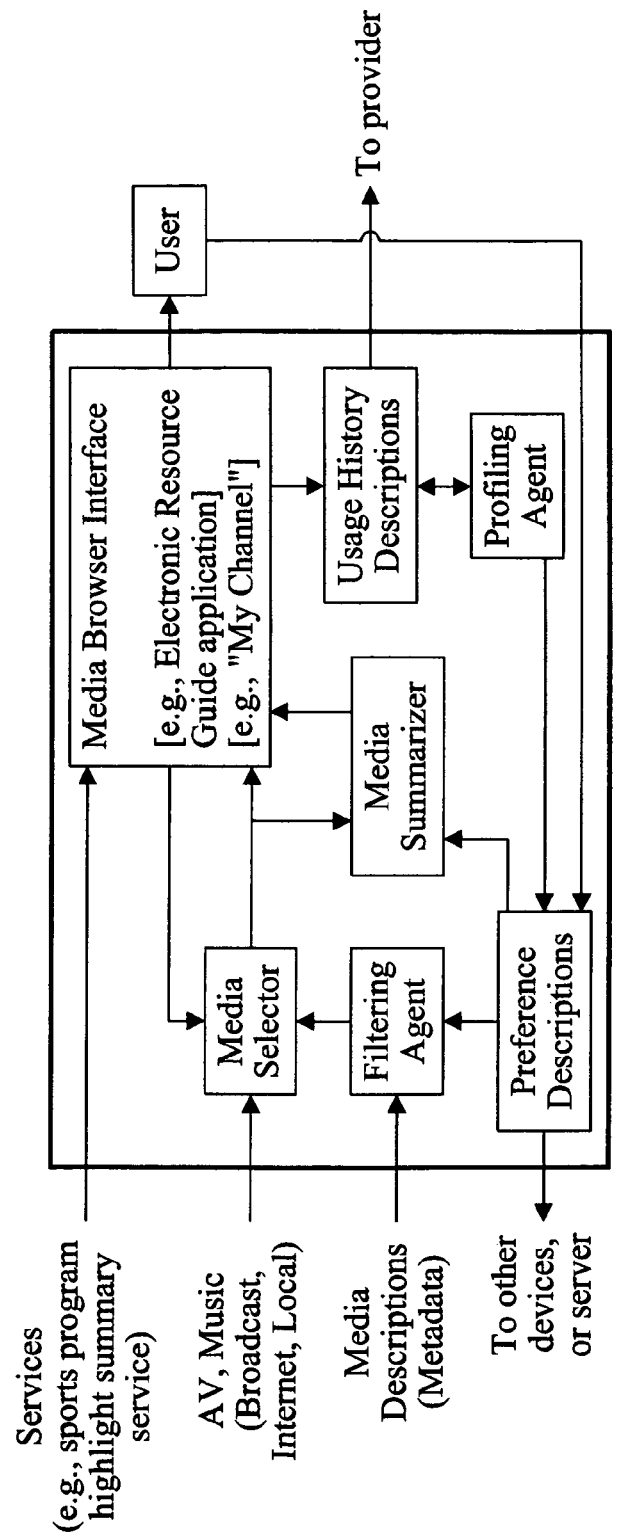
FIG. 27 illustrates the video summarization module as part of a media browser and/or a service application.

Referring to FIG. 1, a procedure for summarization of a football video includes receiving a video sequence 20 that includes at least a portion of a football game. Block 22 detects the start of a play of a video segment of a plurality of frames of the video. After detecting the start of the play, block 24 detects the end of the play, thereby defining a segment of video between the start of the play and the end of the play, namely, a "play". Block 26 then checks to see if the end of the video (or the portion to be processed) has been reached. If the end of the video has not been reached block 26 branches to block 22 to detect the next play. Alternatively, if the end of the video has been reached then block 26 branches to the summary description 28. The summary description defines those portions of the video sequence 20 that contain the relevant segments for the video summarization. The summary description may be compliant with the MPEG-7 Summary Description Scheme or TV-Anytime Segmentation Description Scheme. A compliant media browser, such as shown in FIG. 27, may apply the summary description to the input video to provide summarized viewing of the input video without modifying it. Alternatively, the summary description may be used to edit the input video and create a separate video sequence. The summarized video sequence may comprise the selected segments which excludes at least a portion of the original video other than the plurality of segments. Preferably, the summarized video sequence excludes all portions of the original video other than the plurality of segments.

The present inventors then considered how to detect a "play" from a football video in a robust, efficient, and computationally effective manner. After extensive analysis of a typical football game it was determined that a football game is usually captured by cameras positioned at fixed locations around the football field, with each camera typically capable of panning, tilting, and zooming. Each play in a football game normally starts with the center hiking the ball, such as toward the quarterback or kicker. Further, a hiking scene, in which the center is about to hike the ball, is usually captured from a camera location to the side of the center. This camera angle is typically used because it is easier to observe the movements of all of the parties involved (the offense, the center, the quarterback, the receivers, the running back, and the defense) from this viewpoint. Thus a play typically starts with a frame such as shown in FIG. 2.

While an attempt to determine a hiking scene may include complex computationally intensive analysis of the frame(s) to detect the center, the quarterback, or the kicker, and the offense/defense, together with appropriate motion, this generally results in non-robust hiking scene detection. To overcome this limitation the present inventors were dumbfounded to recognize that the scenes used to capture a football video typically use the same set of camera angles. The football game normally includes cameras sitting either on one side of the field and on the two ends of the field. The side cameras are normally located in the stadium above the 25, 50, and 25 yard lines, and the two end cameras are located at the ends of the fields. There may be additional cameras, such as handheld cameras, but most of the events are captured by the side cameras and the end cameras. In general there are two different types of plays, namely, place kicks and regular plays (e.g., plays that are not place kicks). In general, place kicks (which include the kick-offs, extra point attempts, and field goal attempts) are usually captured by a camera near the end of the field, while a regular play (including runs, passes, and punts) is usually captured by a side camera. It is also noted that a kick-off is usually captured by an end camera followed by a side camera. Accordingly, the different plays of a football video may be categorized as one of two different types of plays, namely, a place kick, and a regular play.

Figure 2:
FIG. 2 is an exemplary illustration of a hiking scene in football.

The regular play typically starts with a frame such as that shown in FIG. 2. The camera then follows the ball until the ball is called dead, at which time the current regular play ends. After the end of the regular play there is typically a camera break, at which time the camera views other activity, such as the commentators or the fans. The time between the camera break and the start of the next play is usually not exciting and thus should not be included in the summary.

Figure 3:
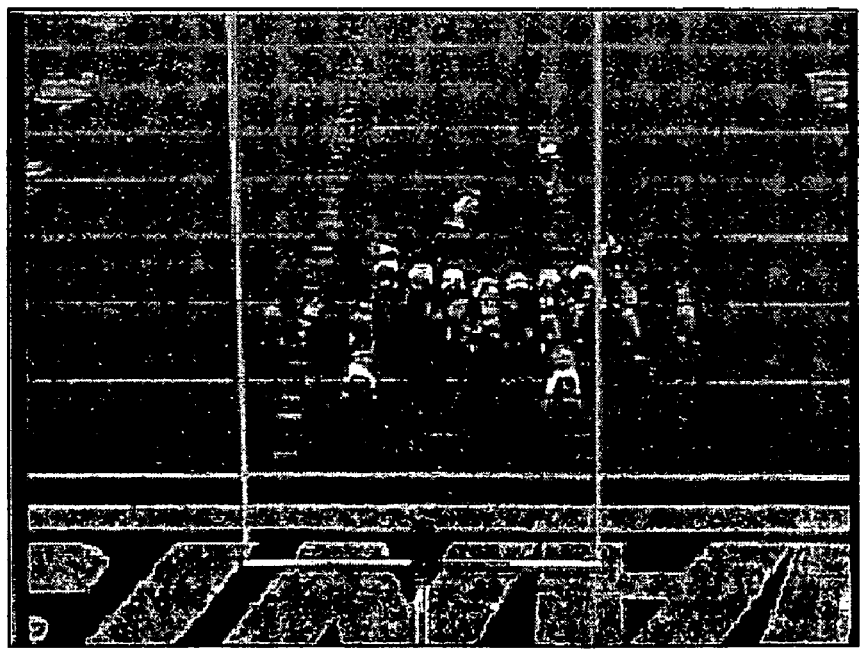
FIG. 3 is an exemplary illustration of a kicking scene in football.

The place kick typically starts with a frame such as that shown in FIG. 3, and it normally ends with a camera break, in a manner similar to the regular play. For the place kick, there are normally more than one camera break before the end of the play, such as for example, a first camera break at the switch from the end camera to the side camera, and a second camera break when the play ends.

To determine a start of a play, such as those shown in FIGS. 2 and 3, the present inventors considered criteria that may be suitable to characterize such an event. The criteria to determine the start of the play is based on anticipated characteristics of the image, as opposed to analyzing the content of the video to determine the actual events. One criteria that may be used to determine the start of a play is the field color. Under the assumption that a camera provides a typical start frame like those shown in FIG. 2 or 3, it may be observed that the field has a generally green color. Accordingly, a characteristic of the start of a play may be if a sufficient spatial region of the frame has the generally green color. The sufficient spatial generally green region may be further defined by having shape characteristics, such as substantially straight edges, a set of substantially parallel edges, a four-sided polygon, etc. Further, the spatial region of the generally green color is preferably centrally located within the frame. Thus, it would initially appear that the start of a play can be detected by locating frames with a generally green dominant color in the central region. The aforementioned color test is useful in detecting the start of a play. However, after further analysis it was determined that merely detecting the generally green dominant color centrally located is sufficient but may be insufficient for a robust system. For example in some implementations, a dominant generally green color may be a necessary condition but not a sufficient condition for determining the start frame of play.

For example, the color characteristic of a central spatial generally green region may exist when the camera is focused on a single player on the field prior to a play. In addition, the precise color of the generally green color captured by the camera varies from field to field, from camera to camera, and from day to night. In fact, even for a given game, since it may start in late afternoon and last into early evening, the lighting condition may change, causing the generally green color of the same field to vary significantly during the video. Moreover, the generally green field color is typically not uniform and includes variations. Thus it is preferably not to use a narrow definition of the generally green color (e.g., excluding other non-green specific colors). Therefore, it is preferable to use a broad definition of generally green. If a broad definition of a generally green color is used, such as ones that includes portions of other colors, then a greater number of non-play scenes will be identified.

Figure 4:
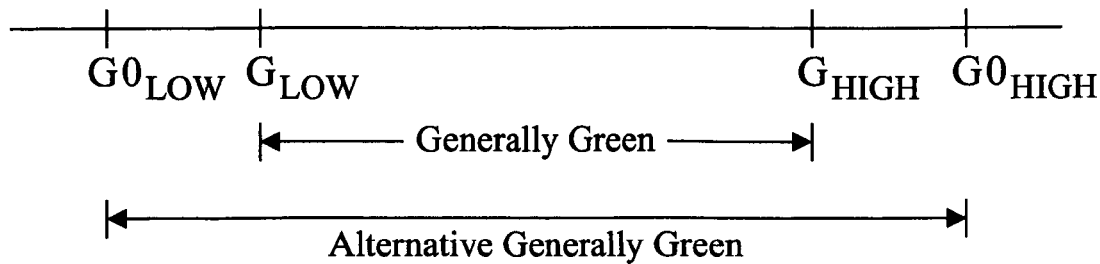
FIG. 4 illustrates one example of a generally green color region.

With the generally green color of the field not being constant, it is desirable to calibrate the generally green color for a specific football video. Further, it is desirable to calibrate the generally green color for a specific portion of a football video, with the generally green color being recalibrated for different portions of the football video. Referring to FIG. 4, using the hue component in the HSV color space as an example, the preferred system provides a range of generally green colors, such as $G_{low}$ and $G_{high}$, with generally green being defined there between. The $G_{low}$ and/or $G_{high}$ may be automatically modified by the system to adapt to each particular football video and to different portions of the video.

With the variation of the field color even within a game, the present inventors determined that a color histogram $H_g$ of the generally green color in addition to a range given by $G_{low}$ and $G_{high}$, provides a more accurate specification of the field color. The $H_g$ may calibrated for a specific football video. Also $H_g$ may be calibrated for a specific portion of the football video, with the $H_g$ being recalibrated for different portions of the football video. Even with two frames of the video showing the field the resulting color histograms will tend to be different. Thus, it is useful to estimate the extent to which the field color histograms vary in a particular football video, or portion thereof. It is preferable to use the field scenes, however detected, from which to estimate the color histograms.

Figure 5:
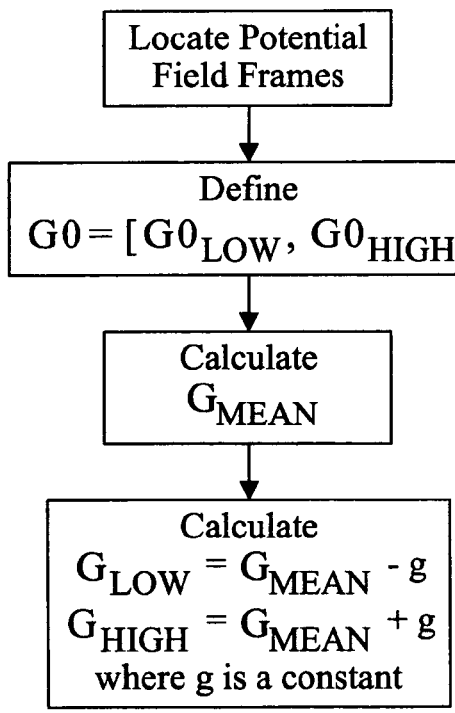
FIG. 5 is a technique for defining the generally green color region.

The following technique may be used to determine $G_{low}$, $G_{high}$, and $H_g$. Referring to FIG. 5, for all (or a portion of) the frames containing the field all the generally green pixels are located. For this initial determination preferably the generally green pixels are defined to include a large interval. The interval may be defined as $G0=[G0_{low}, G0_{high}]$. Next a statistic measure of the generally green pixels is calculated, such as the mean hue green value $G_{mean}$ of all the pixels. Next $G_{low}$ and $G_{high}$ may be set. One technique for setting $G_{low}$ and $G_{high}$ is: $G_{low}=G_{mean}-g$, $G_{high}=G_{mean}+g$, where g is a constant such that $G_{high}-G_{low}<G0_{high}-G0_{low}$. In essence, the technique narrows (i.e., reduces its gamut) the range of generally green colors based on color based information from the football video.

Figure 6:
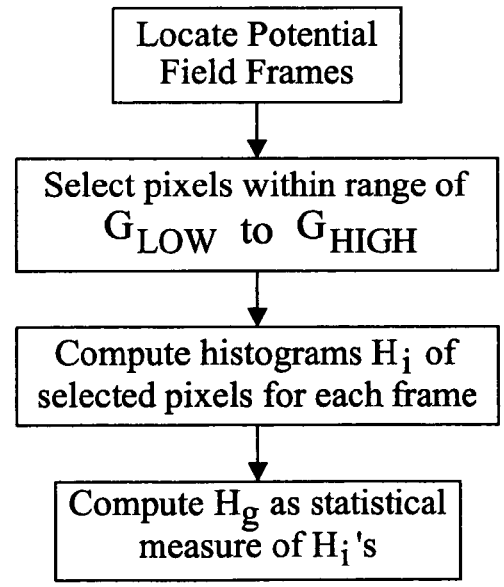
FIG. 6 is a technique for defining histograms for the field frames.

The following technique may be used to determine the color histogram $H_g$. Referring to FIG. 6, all (or a portion of) the frames containing the field are selected. Within these field frames all (or a portion on) the pixels falling in the range of $G_{low}$ and $G_{high}$ are selected. Other ranges of generally green colors may likewise be used. The color histogram $H_i$ for each of these sets of pixels in each of the frames is then determined. Then $H_g$ is computed as a statistical measure, such as the average, of all the calculated color histograms $H_i$. In particular the variation of $H_g$ may be calculated as follows.

For any frame containing the field, compute the error between $H_i$ and $H_g$:

$$e_i = \|H_g - H_i\| \text{ where } \|\cdot\| \text{ is the } L_1 \text{ norm.}$$

The sample mean is computed as:

$$m_e = \frac{1}{N} \sum_i e_i$$

The sample standard deviation of all the errors is calculated as:

$$v = \sum_i ((e_i - m_e)^2 / (N-1))^{1/2}$$

with N being the number of frames, v being a measure for evaluating how a color histogram is different from the average $H_g$.

With the green color being calibrated, the system may test if a frame is likely the start of a play by checking the following two conditions:

(1) if the frame has more than $P_1\%$ generally green pixels;
(2) if the color histogram $H_1$ of these generally green pixels is close enough to Hg.

The first condition may be examined by counting the number of pixels whose hue value falls in $G_{low}$, $G_{high}$. The second condition may be examined by checking if the difference between $H_1$ and $H_g$ is smaller than a threshold, i.e., if $\|H_1 - H_g\| < T_h$. The threshold $T_h$ may be determined as:

$$T_h = m_e + c \cdot v,$$

where c is a constant, typically 3 or 4.

If both conditions are satisfied, then a potential start is detected, and this frame may then be further checked by other modules if it is desirable to confirm a detection. If however, the frame has only more than $P_2\%$ green pixels ($P_2 < P_1$), and the second condition is satisfied, then the field line detection module described later should be used to increase the confidence of an accurate determination of a potential start of a play.

Figure 7:
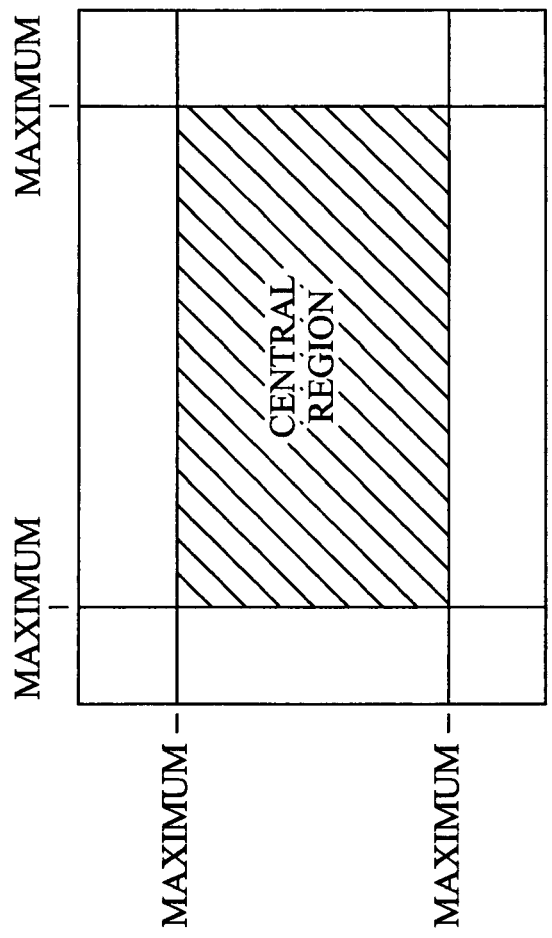
FIG. 7 illustrates the definition of a central region of a frame and/or field.

After consideration of actual frames of the start of a play in football videos the present inventors observed that sometimes the start frames contain non-field regions on the top and the bottom, and further may contain editing bars on the side or on the bottom. These factors are not especially compatible with the use of the thresholds $P_1$ and $P_2$, as previously described. For the thresholds $P_1$ and $P_2$ to be more robust, only the center region (e.g., primarily generally within such non-field regions and editing bars) of the frame should be used when computing the percentages. Referring to FIG. 7, the center region may be defined as follows.

(1) scan a frame row-by row, starting from the first row, until a row that has dominant generally green pixels is located, or until a predetermined maximum is reached, whichever occurs first;

(2) scan the frame row-by-row, starting from the bottom row, until a row that has dominant generally green pixels is located, or until a predetermined maximum is reached, whichever occurs first;

(3) scan the frame column-by-column, starting from the right column until a column that has dominant generally green pixels is located, or until a predetermined maximum is reached, whichever occurs first;

(4) scan the frame column-by-column, starting from the left column until a column that has dominant generally green pixels is located, or until a predetermined maximum is reached, whichever occurs first;

(5) the locations at which the scanning stopped (e.g., found the dominant generally green color or otherwise a predetermined maximum), defines the central region of the frame.

The preferred predetermined maximums are ¼ of the row number as the constant in the scanning of the rows and ⅙ of the column number as the constant in the scanning of the columns.

After further consideration of the football video, the present inventors likewise observed a pattern exhibited by the football video at the start of a play, namely, the field lines. The presence of the field lines is a strong indication of the existence of a corresponding field being viewed by the camera. The field lines may be characterized by multiple substantially parallel spaced apart substantially straight lines or lines on a contrasting background. The field lines may alternatively be characterized by multiple spaced apart generally white lines. In addition, the field lines may be characterized as a pattern of lines on a background primarily a generally green color. Also, the field lines may be further constrained as being of a sufficient length relative to the size of the field or image. In the preferred system, the field lines are characterized as two, three, or four of the above. This length consideration removes shorter lines from erroneously indicating a field. The identification of the frames of video representing fields using the field lines may be used as the basis for the color calibration, if desired.

Figure 8:
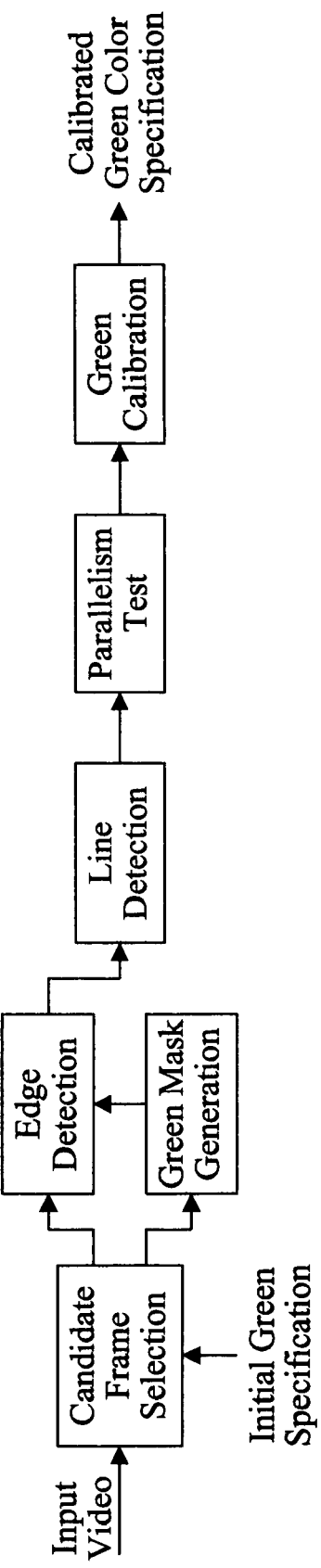
FIG. 8 illustrates candidate frame selection based upon an initial generally green selection.

Referring to FIG. 8, the preferred system includes candidate frame selection by using an initial green specification, such as $G0 = [G0_{low}, G0_{high}]$. Then those frames with a primary color G0 are identified. A green mask may be obtained by setting a value of "1" to locations defined by the G0 color and "0" to the other locations. The green mask may then be diluted, if desired, to allow the inclusion of small regions adjacent to the green G0 region. The edge detection may then be performed on the frames followed by filtering with the green mask. This step is intended to eliminate those edge pixels that are not on the generally green background. A line detection is then performed on the filtered edge map, such as with a Hough transform, to get lines that are longer than $L_{min}$. It is to be understood that any suitable technique may be used to identify the lines, and in particular the lines within a generally green background.

Figure 11:
FIG. 11 illustrates parametric lines for the edge detection of FIG. 10.
Figure 10:
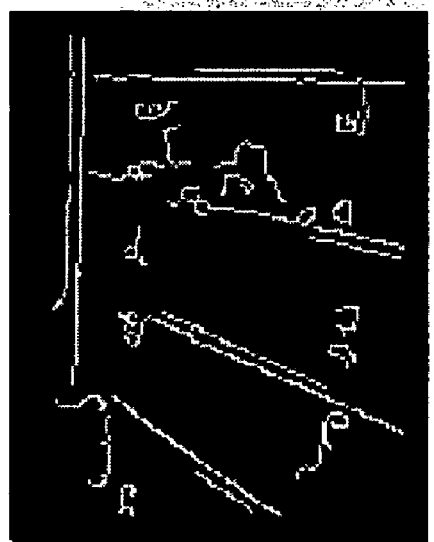
FIG. 10 illustrates edge detection for the image in FIG. 9.
Figure 9:
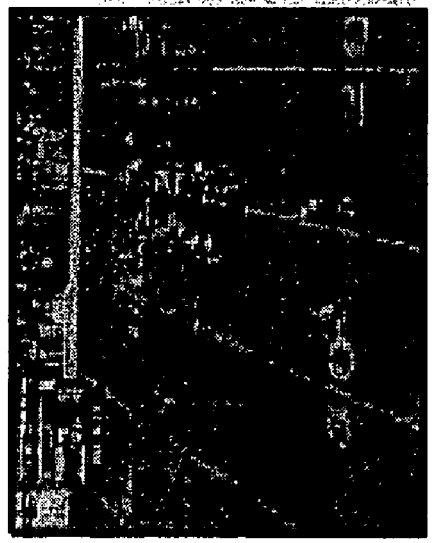
FIG. 9 is an exemplary illustration of a hiking scene in football.

After experimentation with the line detection scheme there remains a small probability that such line detection will result in false positives, even in a generally green background. The present inventors further considered that an image of a field from a single viewpoint results in some distortion of the parallel alignment of the field lines. In particular, a plurality of the field lines will appear to converge at some point (or points). Preferably, all of the field lines will appear to pass through approximately the same disappearing point since the field lines are parallel to one another on the field. Referring to FIG. 9, a sample frame is shown. Referring to FIG. 10, the result of the edge detection is shown. Referring to FIG. 11, the parametric lines along the vertical direction are illustrated, with the lines passing generally through the same point.

In the preferred system, the condition that is used is detecting at least three lines that pass through approximately the same point when projected. This additional condition, especially when used in conjunction with previous field line determination, significantly decreases the likelihood of false positives. Similarly, when the frame is from an end camera, such as shown in FIG. 3, the field lines would appear to be nearly horizontal and parallel to each other in the image domain, which is likewise a test for determination of a field. As shown in FIG. 8, in either case (side view of the field or end view of the field) the task is to test if the lines are parallel in the physical world, and this is referred to as the parallelism test. After the parallelism test the green may be calibrated and the start of a play may be determined based upon these characteristics.

The present inventors observed that there are some cases where the field may contain multiple regions of clay which is of generally brown color. The color calibration technique described above can be similarly applied to deal with these cases so that the system can handle fields of generally green color, fields of generally green and generally brown colors, and fields of generally brown color. Other techniques may likewise be applied to the generally brown, or generally brown and generally green.

The present inventors observed that in many cases the two teams are lined up and most of the motion stops before the start of a play. At this point, the camera motion may tend to zoom in to get an improved picture and stays focused on the players until the play starts. Thus at the moment right before a play starts, there will tend to be no significant motion in the image domain (neither camera-induced motion nor player motion). Therefore, the present inventors determined that the camera motion may be used as an additional indicia of the start of a play. In many instances, a start-of-play will induce a zooming in camera motion that then stops zooming with the scene being free from significant motion. This is another characteristic that may be used to indicate the start of plays. This technique may likewise be used in conjunction with other techniques to decrease false positives.

Figure 12:
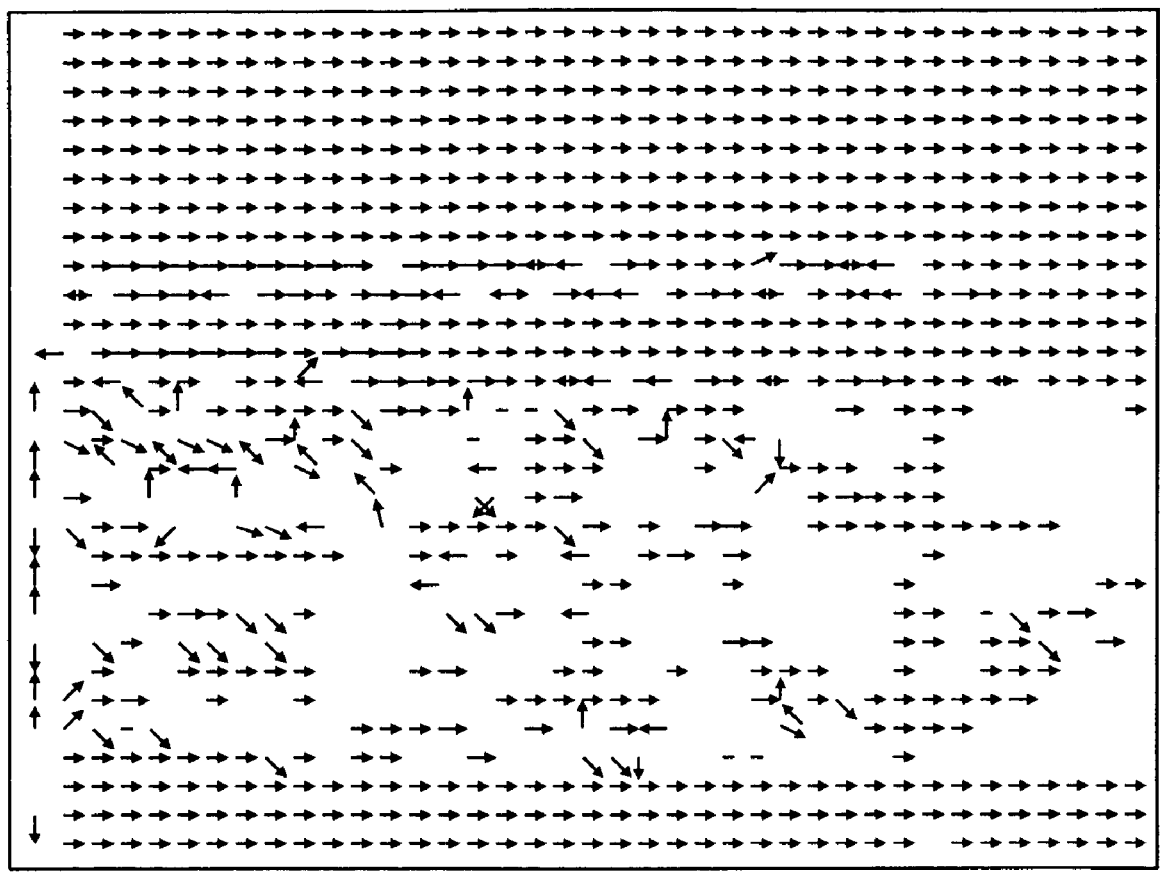
FIG. 12 illustrates computed motion vectors for football video.

There are several techniques that may be used for estimating camera motion. Some methods such as optical flow estimation may provide dense motion fields and hence provide relatively accurate motion estimation results. However, optical flow techniques and similar techniques, are computationally expensive. A less computationally expensive technique is to infer the camera motion from block-based motion compensation. In addition, the motion information is available without additional computation if the system is operating on compressed streams of encoded video, such as a MPEG-like bitstream. It has been determined that the translational motion can be accurately estimated from the motion vectors whereas zooming is not accurately estimated from the motion vectors. The inaccuracy of the motion vectors for zooming may be based on the varying rate of zooming and the scale changes induced by zooming. Therefore, the motion information is preferably used in the following manner: if the camera motion is not primarily translational, the system waits additional frames to confirm the start of a play; otherwise, the start-of-play is declared as long as other conditions are satisfied. A waiting period in the first has dual functions: firstly, it excludes from the summary some frames when the camera is zooming before a start of the play; and secondly, it makes the detection of the start-of-play more robust since more frames have been used to confirm the detection. FIG. 12 illustrates an example of computed motion vectors, when the camera is switched on after a play has started. It is not difficult to deduce that the camera is panning in this situation, based on the primary direction of the motion vectors. In this case a start-of-play may be declared.

As illustrated in FIGS. 2 and 3, in a start-of-play frame, the players appear as scattered blobs in the image. The blobs may be represented by their color and/or texture, and compared against a model of the anticipated color and/or texture for a player. The color and/or texture may be varied, based on the particular team's clothing. In this manner, the system is customizable for particular teams. In the case that there are scattered non-generally green blobs their color characteristics may be compared against a model. In addition, the system may determine, using other techniques, to determine potential start of play frames and use these frames as the basis to calculate color histograms for the players.

Figure 15:
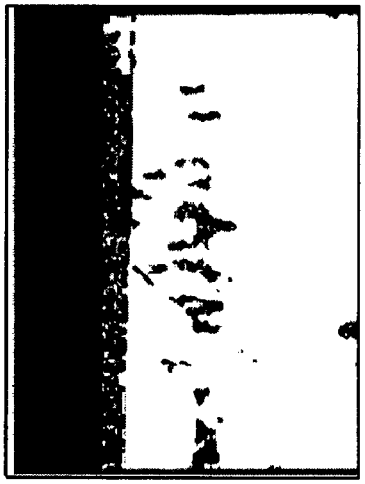
FIG. 15 illustrates an exemplary green mask for an image of a football player.
Figure 14:
FIG. 14 illustrates a green mask for the image of FIG. 13.
Figure 13:
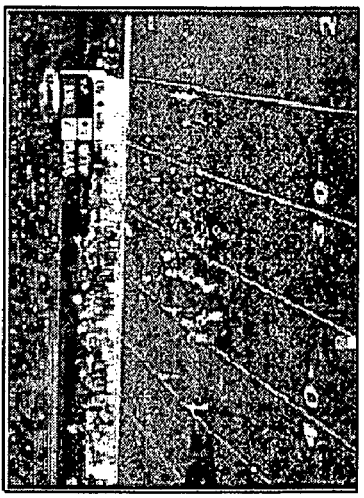
FIG. 13 illustrates an exemplary start of a football play.
Figure 18:
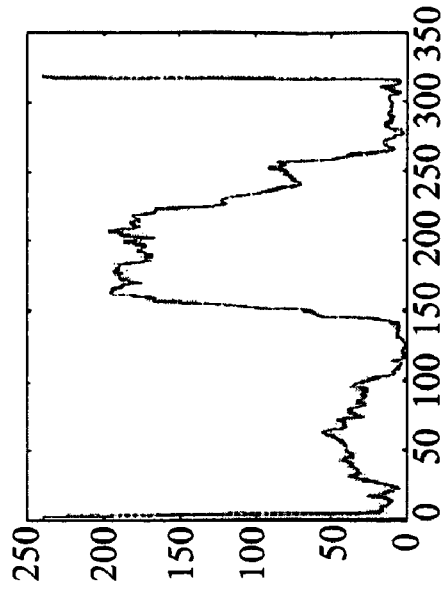
FIG. 18 illustrates a projection of the green mask of FIG. 15.
Figure 17:
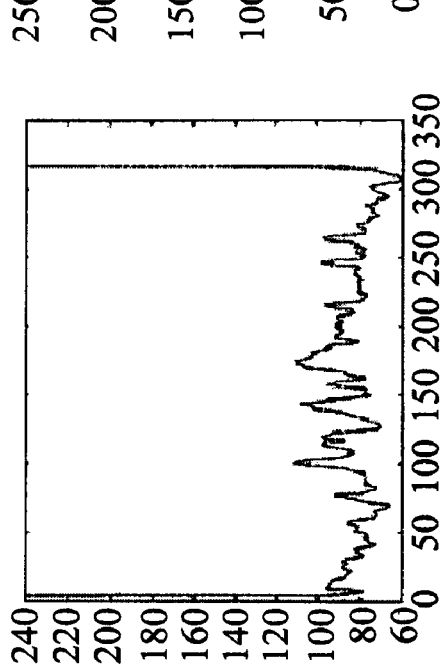
FIG. 17 illustrates a projection of the green mask of FIG. 14.
Figure 16:
FIG. 16 illustrates an exemplary football player.

Referring to FIG. 13, at the start of the football play the each of the teams tend to line up in some manner. This line up of the players may be used as a characteristic upon which to determine the start of a play. The characteristic of a suitable line up of players includes a generally aligned set of non-generally green blobs (e.g., regions), such as the green mask shown in FIG. 14, as previously described. Further, the blobs should have a relatively small size, especially in relation to the size of the field. In contrast, a relatively large non-generally green blob, such as the green mask shown in FIG. 15, is more likely indicative of a close up of a player, such as shown in FIG. 16. To characterize the spatial distribution of the non-generally green regions the green masks may be projected into x and y directions, such as shown in FIG. 17 and FIG. 18. A high and wide peak in the projection, as shown in FIG. 18, is less likely to indicate the start of a play than a generally low set of peaks, as shown in FIG. 17. Another approach for analyzing the line up of players may be determining two distinctive groups of blobs lining up along both sides of a "line" that is parallel to the field lines.

Figure 19:
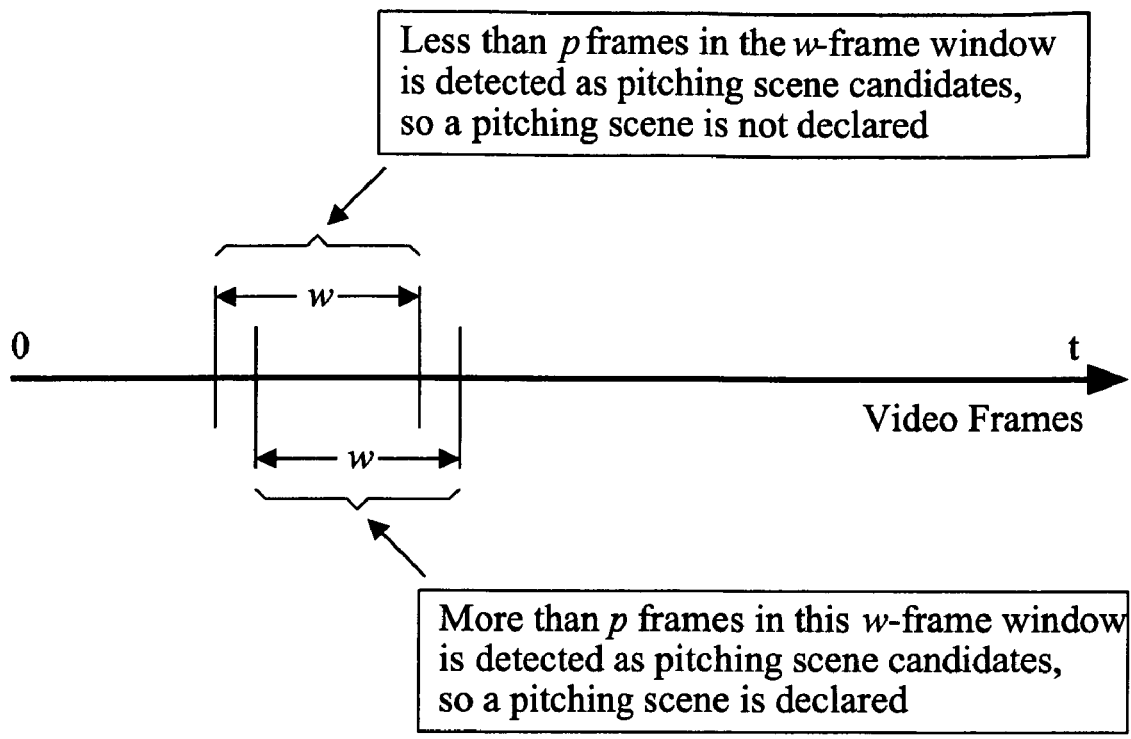
FIG. 19 is an illustration of temporal evidence accumulation.

After further consideration, the present inventors determined that if a hiking scene and accordingly a play segment is identified after locating only one candidate frame, then the system may be susceptible to false positives. By examining a set of consecutive frames (or other temporally related frames) and accumulating evidence, the system can reduce the false positive rate. Referring to FIG. 19, the following approach may be used to achieve temporal evidence of accumulation: when detecting a hiking scene, a sliding window of width w is used (e.g., w frames are considered at the same time). A hiking scene is declared only if more than p out of the w frames in the current window are determined to be hiking scene candidates, as previously described. A suitable value of p is such that p/w=70%. Other statistical measures may be used of a fixed number of frames or dynamic number of frames to more accurately determine hiking scenes.

Figure 20:
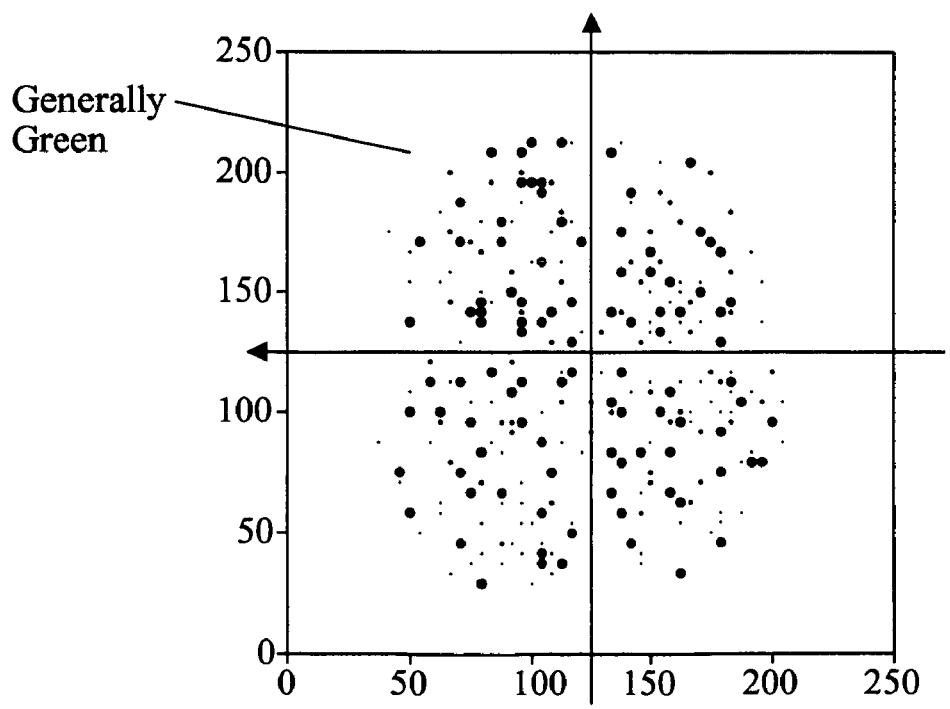
FIG. 20 is an illustration of the U-V plane.

To define the "generally green" color any color space may be used. The preferred color space is the HSV color space because it may be used without excessive computational complexity. Alternatively, a YUV color space may be used as shown in FIG. 20.

While the start of a "play" may be defined as a hiking scene the end of a play, according to the rules of football, can end in a variety of different ways. Image analysis techniques may be used to analyze the image content of the frames after a hiking frame to attempt to determine what occurred. Unfortunately, with the nearly endless possibilities and the difficultly of interpreting the content of the frames, this technique is at least, extremely difficult and computationally intensive. In contrast to attempting to analyze the content of the subsequent frames of a potential play, the present inventors determined that a more efficient manner for the determination of the extent of a play in football is to base the end of the play on camera activities. After analysis of a football video the present inventors were surprised to determine that the approximate end of a play may be modeled by scene changes, normally as a result of switching to a different camera or a different camera angle. The different camera or different camera angle may be modeled by determining the amount of change between the current frame (or set of frames) to the next frame (or set of frames).

Figure 21:
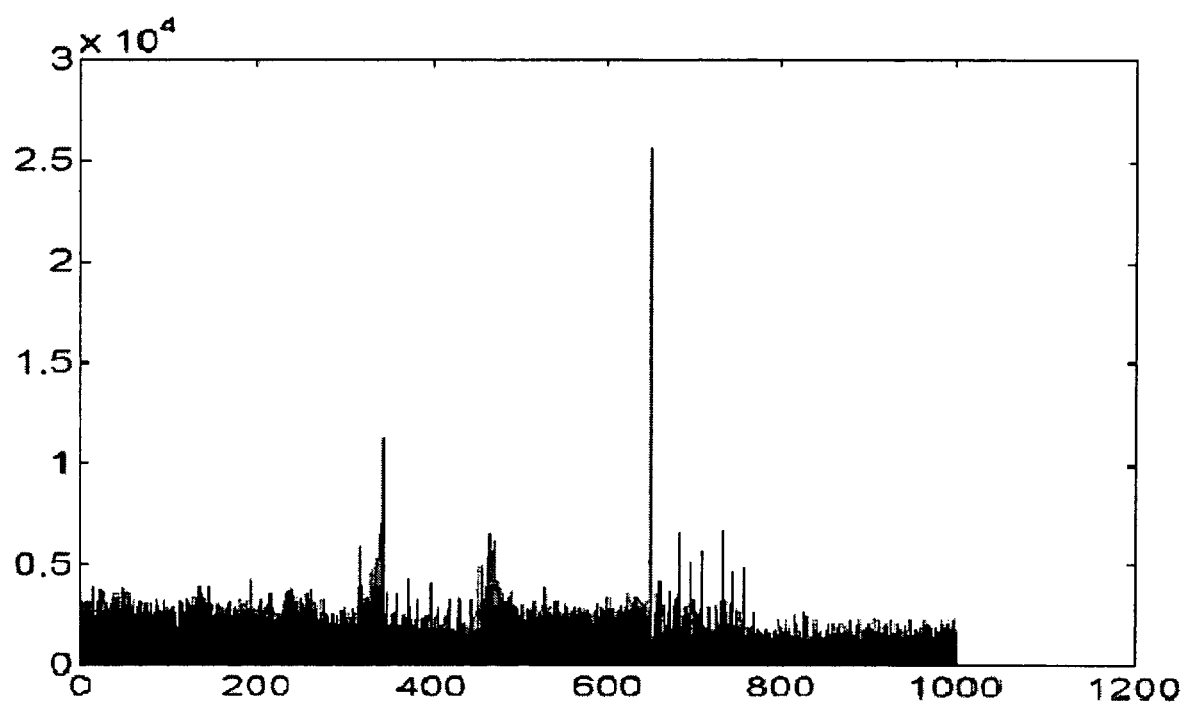
FIG. 21 is an illustration of detecting the end of a play in football.

Referring to FIG. 21, a model of the amount of change between frames using a color histogram difference technique for an exemplary 1,000 frame video football clip is shown. The peaks typically correspond to scene cuts. The system may detect an end of play at around frame 649 by thresholding the color histogram difference. A gradual transition occurs around frame 350.

As previously noted the scene cuts may be detected by thresholding the color histogram differences. The selection of the an appropriate threshold level to determine scene cuts may be based on a fixed threshold, if desired. The appropriate threshold level may be calculated for each football video, either after processing a segment of the video or otherwise dynamically while processing the video. One measure of the threshold level may be based upon the mean m and the standard deviation $\sigma$ of the frame-to-frame color histogram differences from the whole video. The threshold Tc can be calculated as $m+c\sigma$ where c is a constant. It has been found that c=5 or 6 covers practically almost all the clean scene cuts. For robustness, after a clean cut has been detected at frame k, the system may further compute the color histogram difference between frame k−1 and k+1. This difference should be at least comparable to that between k−1 and k. Other comparisons may likewise be used to determine if the difference is a false positive. Otherwise the cut at k may be a false positive. This concept may be generalized to testing the color histogram difference between k−c and k+c, with c being a small positive integer (number of frames).

Even with the aforementioned technique there may be some false detections which do not correspond to a real play. Also, there are situations in which a play is broken into two segments due to for example, dramatic lighting fluctuations (mistaken by the system as a scene cut). Some of these problems can be remedied by post-processing. One example of a suitable post processing technique is if two plays are only separated by a sufficiently short time duration, such as less than a predetermined time period, then they should be connected as a single play. The time period between the two detected plays may be included within the total play, if desired. Even if the two detected plays are separated by a short time period and the system puts the two plays together, and they are in fact two separate plays, this results in an acceptable segment (or two plays) because it avoids frequent audio and visual disruptions in the summary, which may be objectionable to some viewers. Another example of a suitable post processing technique is that if a play has a sufficiently short duration, such as less than 3 seconds, then the system should remove it from being a play because it is likely a false positive. Also, post-processing may be applied to smoothen the connection between adjacent plays, for both video and audio.

When the system is used in an "on-line" environment the entire video is not available for processing. When used in an on-line environment the threshold Tc may be computed based upon m and $\sigma$ for the currently available (or a portion thereof) frames. In addition, to reduce computational complexity, the frames in a single play may be used upon which to calculate m and a.

Figure 22:
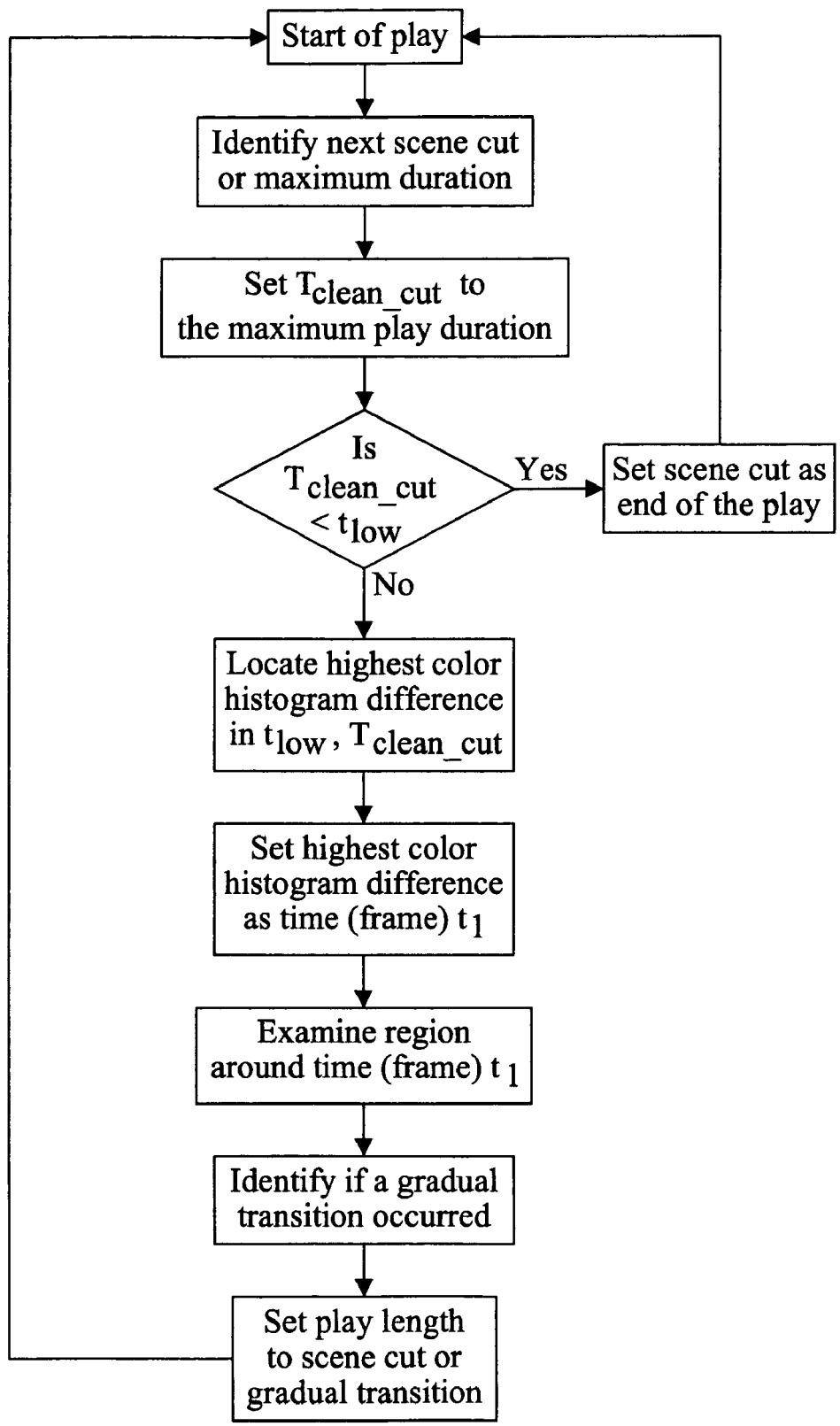
FIG. 22 illustrates the preferred technique to identify the end of the play.

Football video tends to include gradual transitions between plays and other activities, such as commentary. These gradual transitions tend to be computationally complex to detect in the general case. However, in the case of football it has been determined that detecting gradual transitions based upon the color histogram differences is especially suitable. Other techniques may likewise be used. Referring to FIG. 22, the preferred technique may include starting from a start-of-play time ($t_o$) and looking forward until a sufficiently large scene change is detected or until time $t_o+t_p$ is reached, whichever occurs first. $T_p$ relates to the maximum anticipated play duration and therefore automatically sets a maximum duration to the play. This time period for processing to locate gradual transitions is denoted as $t_{clean\_cut}$. If $t_{clean\_cut} < t_{low}$ then the system will not look for a gradual scene cut and set the previously detected scene cut as the end of the play. This corresponds to an anticipated minimum time duration for a play and $t_{low}$ is used to denote the minimum time period. Otherwise, the system looks for the highest color histogram difference in the region $t_{low}$, $t_{clean\_cut}$ or other measure of a potential scene change. This region of the segment is from the minimum time duration to the next previously identified scene cut. This identifies the highest color histogram difference in the time duration which may be a potential scene change. The time of the highest color histogram difference is identified at $t_1$. In a neighborhood of $t_1$, $[t_1-c_1, t_2+c_2]$, a statistical computation is performed, such as computing the mean $m_1$ and the standard deviation $\sigma$ of the color histogram differences. $C_1$ and $c_2$ are constants or statistically calculated temporal values for the region to examine around the highest color histogram difference. A mean filtering emphasizes regions having a relatively large difference in a relatively short time interval. If the color histogram differences at $t_1$, exceeds $m_1 + c_3 * \sigma_1$, where $c_3$ is a constant (or otherwise) and some of its neighbors (or otherwise) are sufficiently large, then the system considers a gradual transition to have occurred at around time (frame) $t_1$. The play is set to the shorter of the previously identified scene cut or the gradual transition, if any.

Besides the technique of using field lines to assist in calibrating the field colors, there are other techniques of color calibration. For example, the calibration may be performed by a human operator or by the system with the assistance of a human operator. The system may perform automatic calibration by using appropriate statistical techniques. A simple technique is as follows. If the system has obtained a set of hiking scene candidates, the system can estimate the color histograms for green colors from these candidates. Under the assumption that most of the candidates are true hiking scene frames, the system can detect statistical outliers in this set. The system then uses the remaining candidate frames to estimate the specifics of the colors. With the green colors calibrated the system can perform both the start-of-play detection and the end-of-play detection more accurately.

Figure 23:
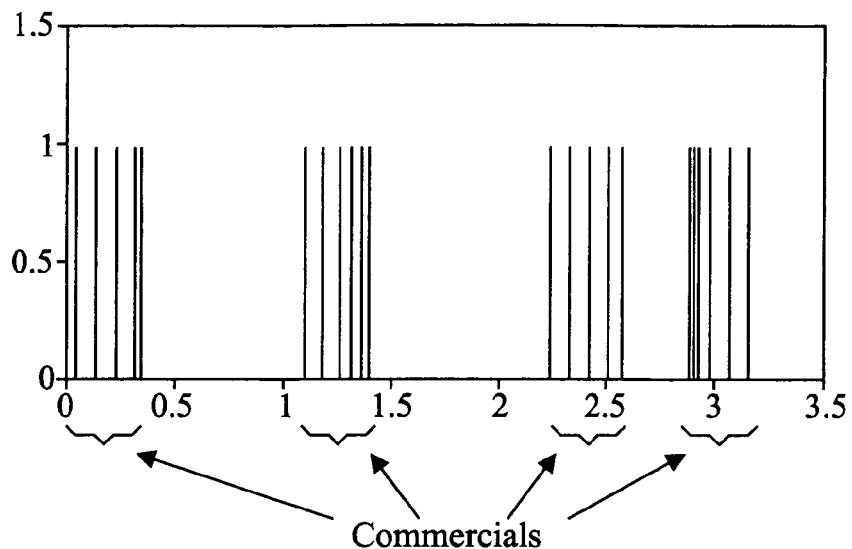
FIG. 23 illustrates the detection of black frames for commercials.
Figure 24:
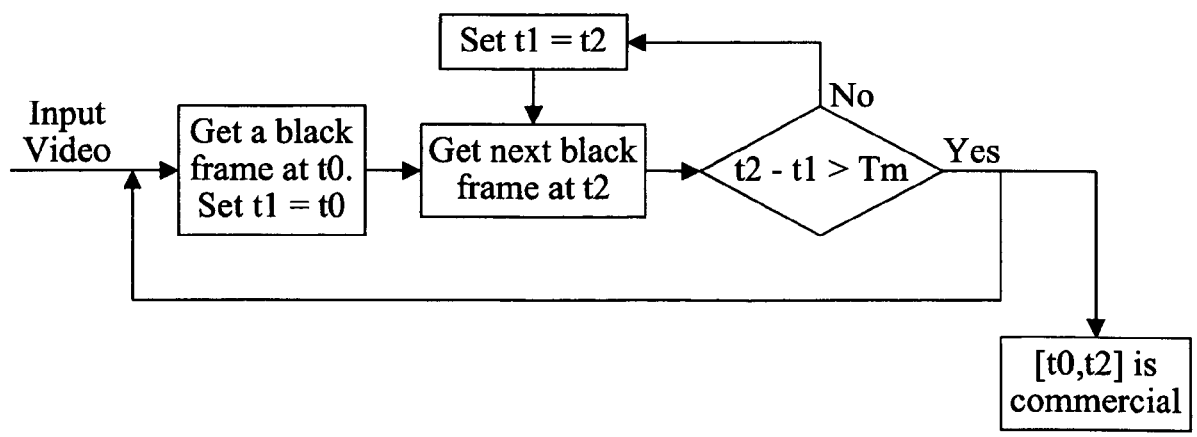
FIG. 24 illustrates an exemplary technique for segment removal based upon commercial information.

A commercial detection module may be used to further refine the potential play segments by removing those segments that are contained within commercials. In the broadcast industry, one or more black frames are inserted into the program to separate different commercials in the same commercial session. Referring to FIG. 23, an example of the distribution of black frames in a video of 35,000 frames, where a line shows the location of a black frame. Visually, it becomes apparent that the clusters of black frames are commercials. One technique for the detection of clusters, is shown in FIG. 24. The algorithm presumes that a regular program session will last at least Tm minutes. For example, Tm is typically larger than three minutes. On the other hand, it is unlikely that a single commercial will last more than two minutes. Thus, as long as black frames are used to separate different commercials in a commercial session, the preferred system will operate properly. By setting Tm reasonably large (e.g., three minutes), the system can still detect commercials even if not all the commercials in a commercial session are separated by black frames. Also, a reasonably large Tm will reduce the likelihood that the regular program is mis-classified as a commercial.

If desired, a slow motion replay detection module may be incorporated. The system detects if a slow motion replay has occurred, which normally relates to important events. The system will capture the replays of plays, the same as the typical non-slow motion replay (full speed), if the same type of camera angles are used. The play segments detected may be identified with multiple characteristics, namely, slow motion replay-only segments, play only segments without slow motion replay segments, and slow motion replay that include associated full speed segments. The resulting summary may include one or more of the different selections of the aforementioned options, as desired. For example, the resulting summary may have the slow-motion replays removed. These options may likewise be user selectable.

While an effective summarization of a football video may be based on the concept of the "play," sometimes the viewer may prefer an even shorter summarization with the most exciting plays included. One potential technique for the estimation of the excitement of a play is to perform statistical analysis on the segments to determine which durations are most likely to have the highest excitement. However, this technique will likely not provide sufficiently accurate results. Further, excitement tends to be a subjective measure that is hard to quantify. After further consideration the present inventors came to the realization that the audio provided together with the video provides a good indication of the excitement of the plays. For example, the volume of the response of the audience and/or the commentators provides a good indication of the excitement. The louder audience and/or commentator acclaims the greater the degree of excitement.

Figure 25A:
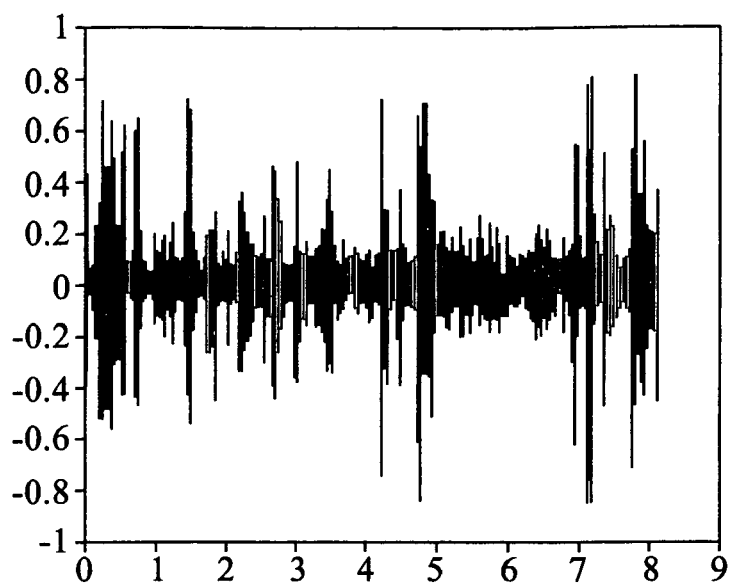
FIGS. 25A-25C illustrate audio segments of different plays.
Figure 25B:
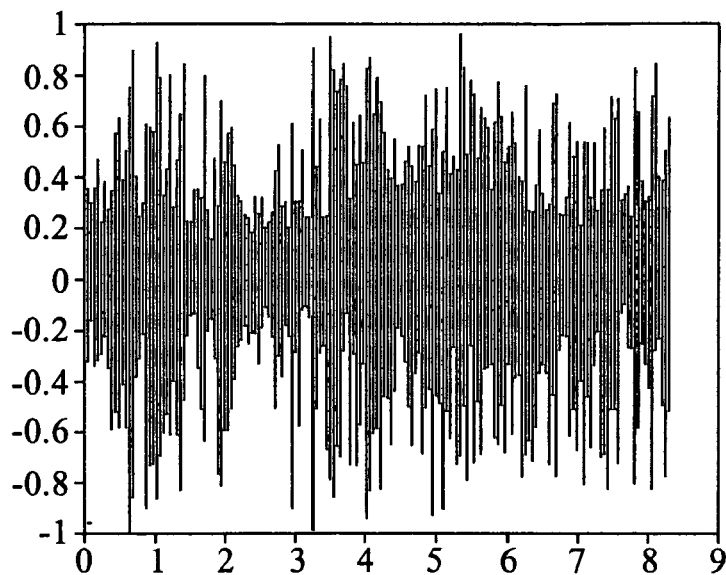
Figure 25C:
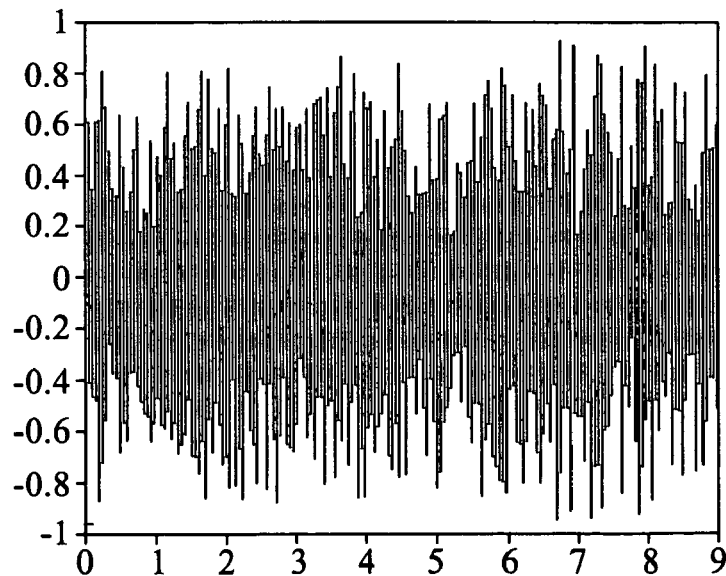

Referring to FIGS. 25A-25C, an exemplary illustration is shown of audio signals having a relatively quiet response (FIG. 25A), having a strong response (FIG. 25B), and having an extremely strong response (FIG. 25C). In general, it has been determined that more exciting plays have the following audio features. First, the mean audio volume of the play is large. The mean audio volume may be computed by defining the mean volume of a play as $$v = \frac{1}{N} \sum_{i=0}^{N-1} S^2(i)$$

where S(i) is the i-th sample, and the N is the total number of samples in the play. Second, the play contains more audio samples that have middle-ranged magnitudes. The second feature may be reflected by the percentage of the middle-range-magnitude samples in the play, which may be computed as $$P = \frac{1}{N} \sum_{i=0}^{N-1} I(|s(i)| > t1 \text{ and } |s(i)| < t2)$$

with I( ) being the indicator function (I(true)=1, and I(false)= 0), t1 and t2 are two thresholds defining the middle range.

Figure 26:
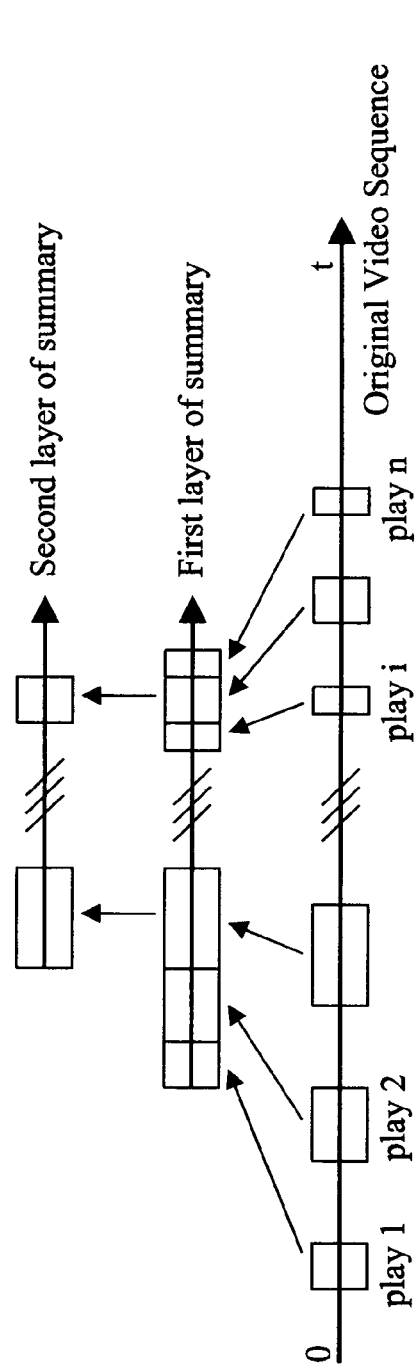
FIG. 26 illustrates forming a multi-layered summary of the original video sequence.

Referring to FIG. 26, the first layer of the summary is constructed using the play detection technique. The second and third layers (and other) are extracted as being of increasingly greater excitement, based at least in part, on the audio levels of the respective audio of the video segments. Also, it would be noted that the preferred audio technique only uses the temporal domain, which results in a computationally efficient technique. In addition, the level of the audio may be used as a basis for the modification of the duration of a particular play segment. For example, if a particular play segment has a high audio level then the boundaries of the play segment may be extended. This permits a greater emphasis to be placed on those segments more likely to be exciting. For example, if a particular play segment has a low audio level then the boundaries of the play segment may be contracted. This permits a reduced emphasis to be placed on those segments less likely to be exciting. It is to be understood that the layered summarization may be based upon other factors, as desired.

Another module that may be included is a goal post detection module. Goal posts are normally pained yellow and have a predetermined U-shape. They normally appear in the image when there is a kick off and the end cameras are used to capture the video, as illustrated in FIG. 3. The detection of goal posts can be used to assist the detection of a kick-off, especially when the camera has a very low shooting angle and thus making the field color based module less robust.

Another module that may be included within the system is a caption detection module. Periodically football video includes captions on the lower or upper portion of the screen that contain information. These captions may be detected and analyzed to determine the occurrence of a particular event, such as a home run. Further, the captions of the summary segments may be analyzed to determine the type of event that occurred. In this manner, the summary segments may be further categorized for further refinement and hierarchical summarization.

From a typical hiking scene as illustrated in FIG. 2, it may be observed that the top portion of the image is usually highly textured since it corresponds to the audience area, while the lower portion is relatively smooth. The present inventors determined that, in a hiking scene, the players' bodies usually result in textured regions. This texture information can be exploited to assist the detection of a hiking scene. The system may obtain a binary texture map as follows. For a pixel P0 in the input frame, the system considers its neighbors, such as P1~P4, as illustrated in the following.

P1
P4 P0 P2
P3

Next, the system computes absolute luminance differences DYi=|Y0−Yi|, for i=1~4, where Yi is the luminance value at pixel Pi. If more than two (2) out of the four (4) DY's are larger than a threshold, then P0 may be considered "textured"; otherwise, P0 is "non-textured". The texture map so-defined is not computationally expensive to obtain. Other texture calculation techniques may likewise be used.

Referring to FIG. 27, the video summarization may be included as part of an MPEG-7 based browser/filter, where summarization is included within the standard. The media summarizer may be as shown in FIG. 1. With different levels of summarization built on top of the aforementioned video summarization technique, the system can provide the user with varying levels of summaries according to their demands. Once the summary information is described as an MPEG:-7 compliant XML document, one can utilize all the offerings of MPEG-7, such as personalization, where different levels of summaries can be offered to the user on the basis of user's preferences described in an MPEG-7 compliant way.

Descriptions of user preferences in MPEG-7 include preference elements pertaining to different summary modes and detail levels.

In the case that the summarization is performed at a server or service provider, the user downloads and receives the summary description encoded in MPEG-7 format. Alternatively, in an interactive video on demand (VOD) application, the media and its summary description reside at the provider's VOD server and the user (e.g., remote) consumes the summary via a user-side browser interface. In this case, the summary may be enriched further by additional information that may be added by the service provider. Further, summarization may also be performed by the client.

Figure 28:
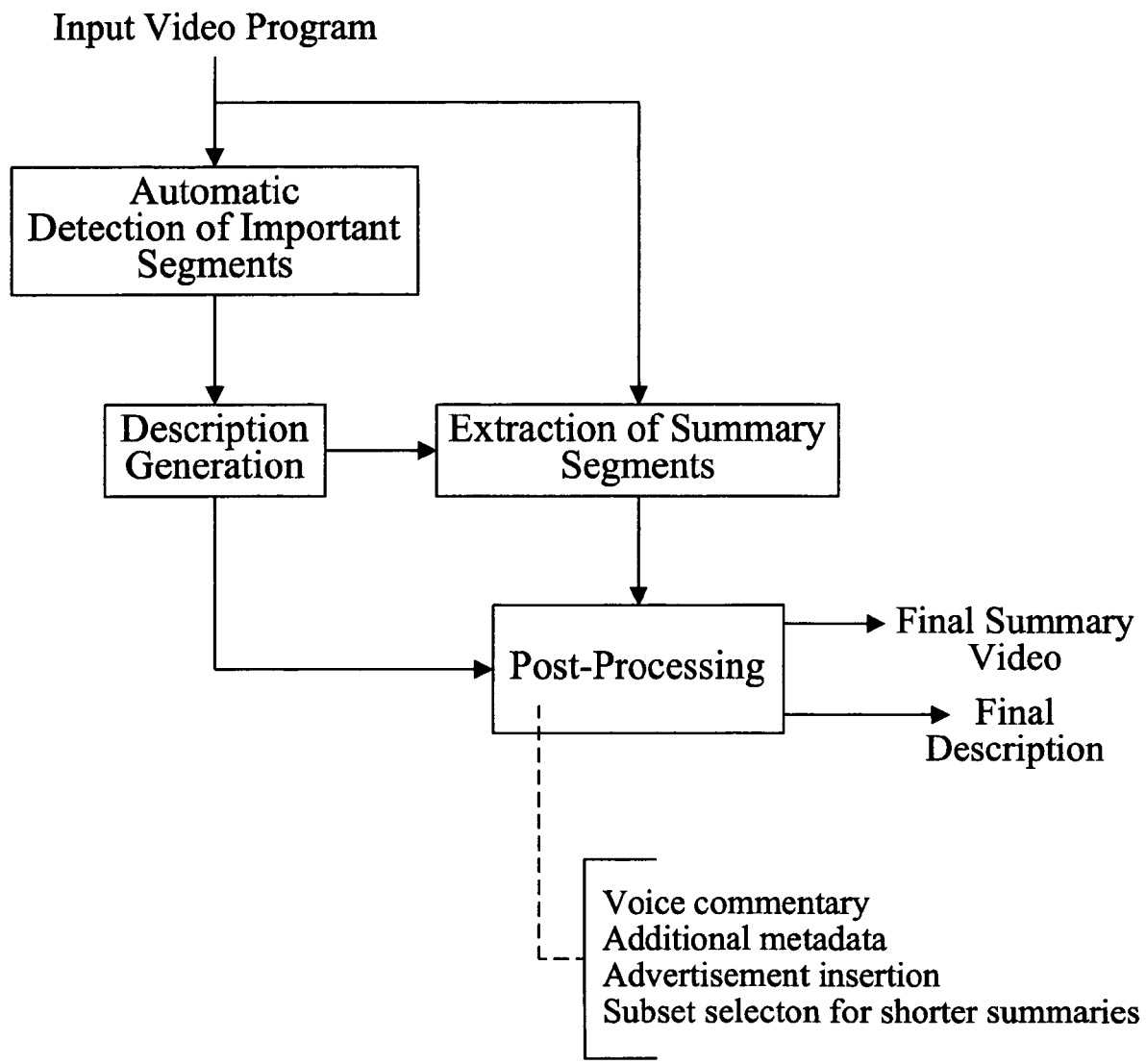
FIG. 28 illustrates a video processing system.

Referring to FIG. 28, the output of the module that automatically detects important segments may be a set of indices of segments containing plays and important parts of the input video program. A description document, such as an MPEG-7 or TV-Anytime compliant description is generated in The Description Generation module. Summary segments are made available to the Post-Processing module by The Extraction of summary Segments module which processes the input video program according to the description. A post-processing module processes the summary Segments and/or the description to generate the final summary video and final description. The post-processing module puts the post-processed segments together to form the final summary video. The post-processing module may transcode the resulting video to a format different that of the input video to meet the requirements of the storage/transmission channel. The final description may also be encoded, e.g., binarized if it is generated originally in textual format such as XML. Post-processing may include adding to the original audio track a commentary, insertion of advertisement segments, or metadata. In contrast to play detection, post-processing may be completely, or in part, manual processing. It may include, for example, automatic ranking and subset selection of events on the basis of automatic detection of features in the audio track associated with video segments. This processing may be performed at the server and then the resulting video transferred to the client, normally over a network. Alternatively, the resulting video is included in a VOD library and made available to users on a VOD server.

Figure 29:
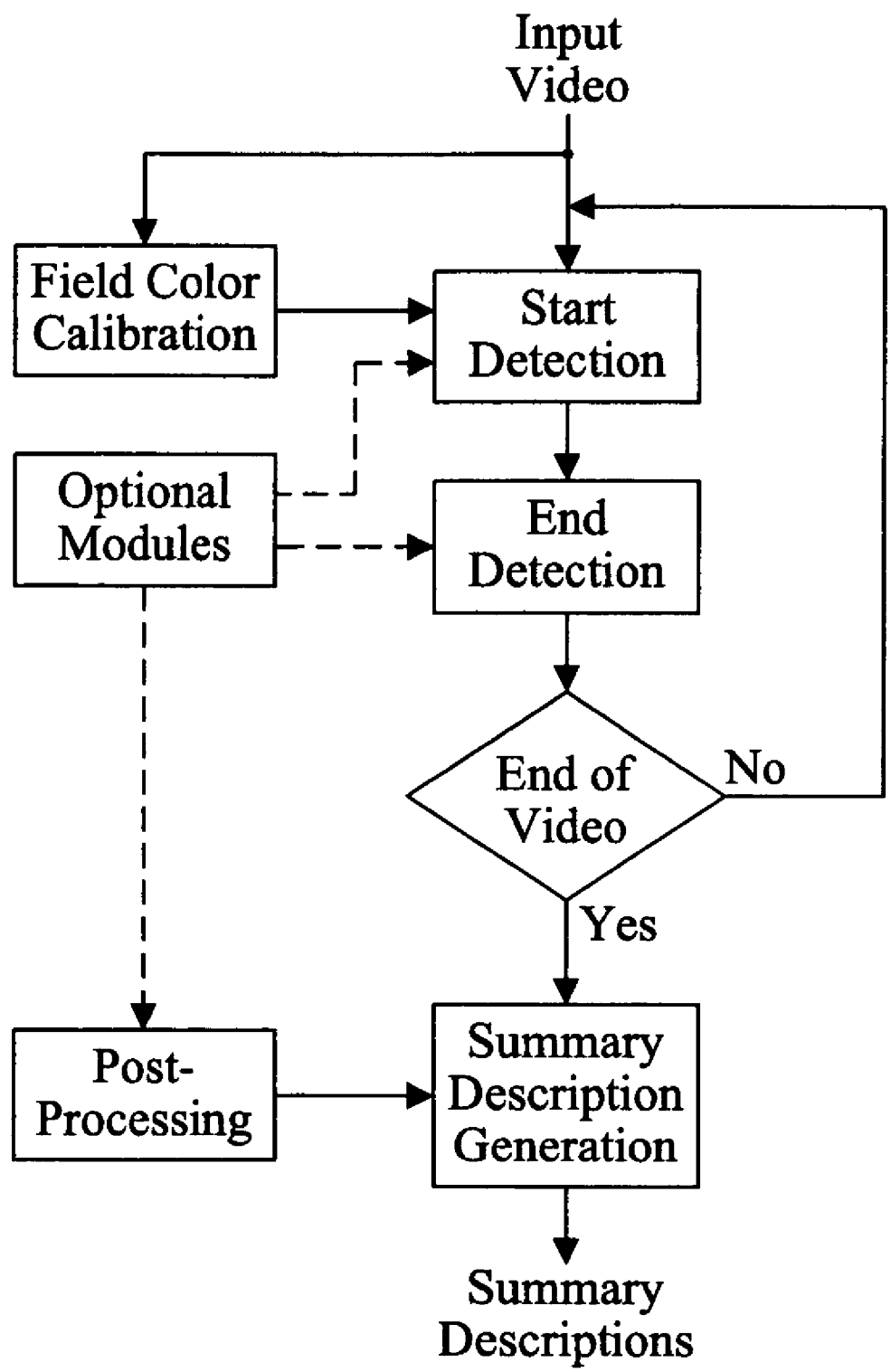
FIG. 29 illustrates an exemplary overall structure of the football summarization system.

Referring to FIG. 29, a system may be developed that incorporates start detection of a play, end detection of a play, and summarization. The detection technique may be based upon processing a single frame, multiple frames, or a combination thereof.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method of processing a video including football comprising:
   (a) a computer identifying a plurality of segments of said video representing an event, wherein said identifying for at least one of said segments includes detecting the start of said event based upon processing of a first single frame of said video, where each of said segments includes a plurality of frames of said video, and wherein said detecting the start of said event is performed without comparing characteristics of any frame of said video to characteristics of frames of model sequences of said event;
   (b) verifying that said first single frame is an appropriate start of said event based upon processing of a plurality of additional single frames, each temporally relevant to said first single frame, concurrently with said processing of said first single frame, where detecting the start of said event includes processing a sliding window of frames considered simultaneously, and where the start of said event is identified when at least a threshold percentage of frames in said sliding window are considered candidate hiking frames, said threshold percentage being less than 100%; and
   (c) creating a summarization of said video by including said plurality of segments, where said summarization includes fewer frames than said video.

2. The method of claim 1 where said threshold percentage is 70%.

3. The method of claim 1 where said steps of processing said first single frame and said processing of said plurality of additional frames detects the zooming of a camera used in capturing said video.

4. The method of claim 1 where said steps of processing said first single frame and said processing of said plurality of additional frames detects a lack of significant motion in said video.

5. The method of claim 1 where said processing said first single frame detects the zooming of a camera used in capturing said video.

6. The method of claim 1 where said processing said first single frame detects a lack of significant motion in said video.

7. A method of processing a video including football comprising:
   (a) a computer identifying a plurality of segments of said video each including a plurality of frames and representing a play initiated by a hiking event, wherein said identifying for at least one of said segments includes individually processing respective frames in a sliding window of a plurality of sequential said frames of said video, said sliding window having a fixed number of frames, and identifying the first frame of a said window of said plurality of sequential frames as the start of said segment when at least a threshold percentage of frames, said threshold less than 100%, in said window are identified as candidate hiking frames; and
   (b) creating a summarization of said video by including said plurality of segments, where said summarization includes fewer frames than said video.

8. The method of claim 7 where said threshold percentage of frames is 70%.

9. The method of claim 7 wherein said identifying is performed without comparing characteristics of any of said one or more sequential frames to characteristics of frames of model sequences of said event.

10. The method of claim 7 where each frame in said sliding window is processed concurrently.

11. A method of processing a video including football comprising:
   (a) a computer identifying a plurality of segments of said video representing an event, wherein said identifying for at least one of said segments includes detecting the start of said event based upon processing of a first single frame of said video, where each of said segments includes a plurality of frames of said video, and wherein said detecting the start of said event is performed without comparing characteristics of any frame of said video to characteristics of frames of model sequences of said event;

(b) verifying that said first single frame is an appropriate start of said event based upon individually processing at least one other single frame temporally relevant to said first single frame, wherein said step of verifying includes individually processing respective frames in a sliding window of a plurality of sequential said frames of said video, said sliding window having a fixed number of frames, and identifying the first frame of a said window of said plurality of sequential frames as the start of said segment when at least a threshold percentage of frames, said threshold less than 100%, in said window are identified as candidate frames for the start of said event; and (c) creating a summarization of said video by including said plurality of segments, where said summarization includes fewer frames than said video.

* * * * *